US012610256B2

(12) United States Patent
Kumar et al.

(10) Patent No.: US 12,610,256 B2
(45) Date of Patent: Apr. 21, 2026

(54) SYSTEMS AND METHODS FOR OPTIMIZING SUPPLY DEMAND IN A TELECOMMUNICATION NETWORK

(71) Applicant: JIO PLATFORMS LIMITED, Ahmedabad (IN)

(72) Inventors: Shailesh Kumar, Hyderabad (IN); Anil Mittal, Hyderabad (IN); Prateek Kumar Jain, New Delhi (IN); Avnish Kumar, Delhi (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 360 days.

(21) Appl. No.: 18/028,549

(22) PCT Filed: Aug. 1, 2022

(86) PCT No.: PCT/IB2022/057108
§ 371 (c)(1),
(2) Date: Mar. 26, 2023

(87) PCT Pub. No.: WO2023/012633
PCT Pub. Date: Feb. 9, 2023

(65) Prior Publication Data
US 2023/0370867 A1      Nov. 16, 2023

(30) Foreign Application Priority Data
Aug. 6, 2021    (IN) .............................. 202121035614

(51) Int. Cl.
| | |
|---|---|
| *H04W 24/02* | (2009.01) |
| *H04W 16/26* | (2009.01) |
| *H04W 16/28* | (2009.01) |

(52) U.S. Cl.
CPC ........... *H04W 24/02* (2013.01); *H04W 16/26* (2013.01); *H04W 16/28* (2013.01)

(58) Field of Classification Search
CPC ..... H04W 24/02; H04W 16/00; H04W 16/18; H04W 16/22; H04W 16/24; H04W 16/28
See application file for complete search history.

(56) References Cited

U.S. PATENT DOCUMENTS 9,332,458 B2      5/2016   Nuss et al.
10,841,853 B1 *   11/2020   Yousefi'zadeh ....... G06N 20/00
(Continued)

FOREIGN PATENT DOCUMENTS

WO        2017184856 A1      10/2017

OTHER PUBLICATIONS

Alessio Zappone et al., "Wireless Networks Design in the Era of Deep Learning: Model-Based, AI-Based, or Both?", IEEE Transactions on Communications, vol. 67, p. 7331-7376, Jun. 20, 2019, Total pp. 43.

(Continued)

*Primary Examiner* — Kevin T Bates
(74) *Attorney, Agent, or Firm* — Davé Law Group, LLC; Raj S. Davé

(57) ABSTRACT

Present disclosure generally relates to data analytics in wireless networks, more particularly relates to systems and methods for optimizing supply demand in telecommunication network. System may prepare data for optimization using raw telecom data. Further, the system may build quadratic optimization objective function by reading index table (cell—grid information). System may build quadratic program inequality constraints, and prepare right hand side of constraints for all mentioned constraints maintaining the index. Thereafter, the system may execute optimizer and find the optimal solution ensuring hyper-parameter tuning, and calculate focal point of each cell using cell-grid allocation vector. The system may read the optimal solution from optimization process, and estimate electronic tilt values (i.e., (Continued)

Remote Electrical Tilt (RET)) ensuring the business guidelines. Thereafter, the system may use line of sight method to get inclination value (optimal tilt value) of cell from the focal point on the ground.

18 Claims, 16 Drawing Sheets

(56)                   References Cited

U.S. PATENT DOCUMENTS

| 12,143,832 | B2 * | 11/2024 | Hu | G06N 3/006 |
|---|---|---|---|---|
| 2009/0075648 | A1 * | 3/2009 | Reed | H04W 24/02 |
| | | | | 455/424 |
| 2013/0142183 | A1 * | 6/2013 | Lee | H04L 5/0057 |
| | | | | 455/517 |
| 2013/0242736 | A1 * | 9/2013 | Tarraf | H04W 24/02 |
| | | | | 370/328 |
| 2016/0157252 | A1 * | 6/2016 | Lu | H04W 24/02 |
| | | | | 370/329 |
| 2016/0255509 | A1 * | 9/2016 | Imran | H04W 64/003 |
| | | | | 455/414.2 |
| 2017/0311278 | A1 | 10/2017 | Adjakple et al. | |
| 2019/0319868 | A1 * | 10/2019 | Svennebring | H04W 24/08 |
| 2019/0373495 | A1 | 12/2019 | Ouyang et al. | |
| 2021/0351973 | A1 * | 11/2021 | Ford | H04L 43/067 |

OTHER PUBLICATIONS

International Search Report, PCT/IB2022/057108, mailed Nov. 15, 2022, Total pp. 03.

\* cited by examiner

200

400

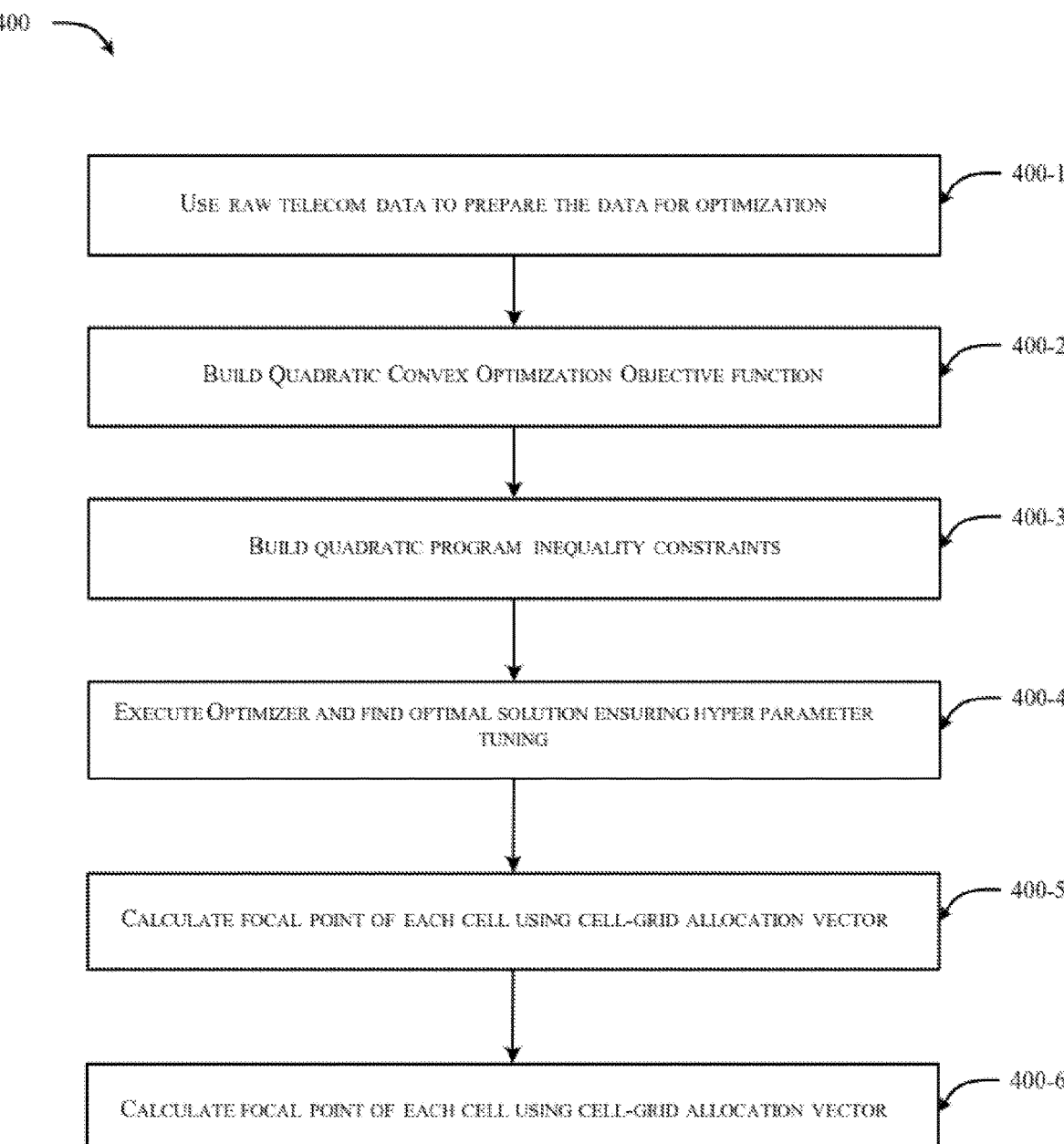

400-1

USE RAW TELECOM DATA TO PREPARE THE DATA FOR OPTIMIZATION 400-2

BUILD QUADRATIC CONVEX OPTIMIZATION OBJECTIVE FUNCTION 400-3

BUILD QUADRATIC PROGRAM INEQUALITY CONSTRAINTS 400-4

EXECUTE OPTIMIZER AND FIND OPTIMAL SOLUTION ENSURING HYPER PARAMETER TUNING 400-5

CALCULATE FOCAL POINT OF EACH CELL USING CELL-GRID ALLOCATION VECTOR 400-6

CALCULATE FOCAL POINT OF EACH CELL USING CELL-GRID ALLOCATION VECTOR

FIG. 4A

402

| EXTRACT TELECOM DATA (USER-CELL SESSION LOG FROM LSR) FOR THE SELECTED GROUP OF CELLS AND GRIDS | 402-1 |

↓

| AGGREGATE USER LEVEL DATA RAW LOCATION DATA (LATITUDE, LONGITUDE) INTO QUANTIZED LOCATION I.E., GEOHASH 7 | 402-2 |

↓

| AGGREGATE CELL-GRID RRC SESSIONS AT HOUR LEVEL AND COMPUTE QUALITY, INTERFERENCE AND DEMAND | 402-3 |

↓

| REMOVE THE RRC SESSIONS WITH NO VALUE FOR QUALITY AND DEMAND AND ALSO THOSE RRC SESSIONS WHICH ARE BELOW THRESHOLD DATA-VOLUME AND QUALITY (RSRP) | 402-4 |

↓

| CALCULATE AGGREGATED VARIOUS EDGE PROPERTIES I.E., HISTORICAL DEMAND, DEMAND-CLUSTER-COEFFICIENT (DEMAND OF GRID SERVED BY THIS GROUP OF CELLS), PREDICTED DEMAND OF THE GRID. | 402-5 |

↓

| EXTRACT HOURLY PEAK DEMAND FORECASTS FOR ALL THE GRIDS FROM THE DEMAND FORECASTING APIs. | 402-6 |

↓

| ADD ALL THE ABOVE RESULTS IN ONE MATRIX TO PREPARE THE DATA FOR OPTIMIZATION | 402-7 |

FIG. 4B

READ INDEX TABLE (CELL – GRID INFORMATION) — 404-1

PREPARE 1-D MATRIX OF SHAPE (1, NUMBER OF EDGES) FOR OVERALL QUALITY IN OBJECTIVE FUNCTION USING FOLLOWING INFORMATION – GRID DEMAND, SIGNAL QUALITY, ALLOCABILITY. — 404-2

POPULATED NORMALIZED 2-D MATRIX OF SHAPE (NUMBER OF EDGES, NUMBER OF EDGES) FOR OVERALL INTERFERENCE IN OBJECTIVE FUNCTION USING FOLLOWING – GRID DEMAND, CELL FREQUENCY BAND, SIGNAL QUALITY, ALLOCABILITY, SCALING FACTOR[BETA]. — 404-3

POPULATE NORMALIZED A 2-D MATRIX OF SHAPE NUMBER OF EDGES, NUMBER OF EDGES) FOR OVERALL OVERLAP OF CELLS IN OBJECTIVE FUNCTION USING FOLLOWING INFORMATION - GRID DEMAND, CELL FREQUENCY BAND, SIGNAL QUALITY, ALLOCABILITY — 404-4

PREPARE 1-D MATRIX OF SHAPE (1, NUMBER OF EDGES) FOR CELL HARMONIZATION IN OBJECTIVE FUNCTION USING FOLLOWING INFORMATION – GRID DEMAND, BAND-WEIGHT, ALLOCABILITY. — 404-5

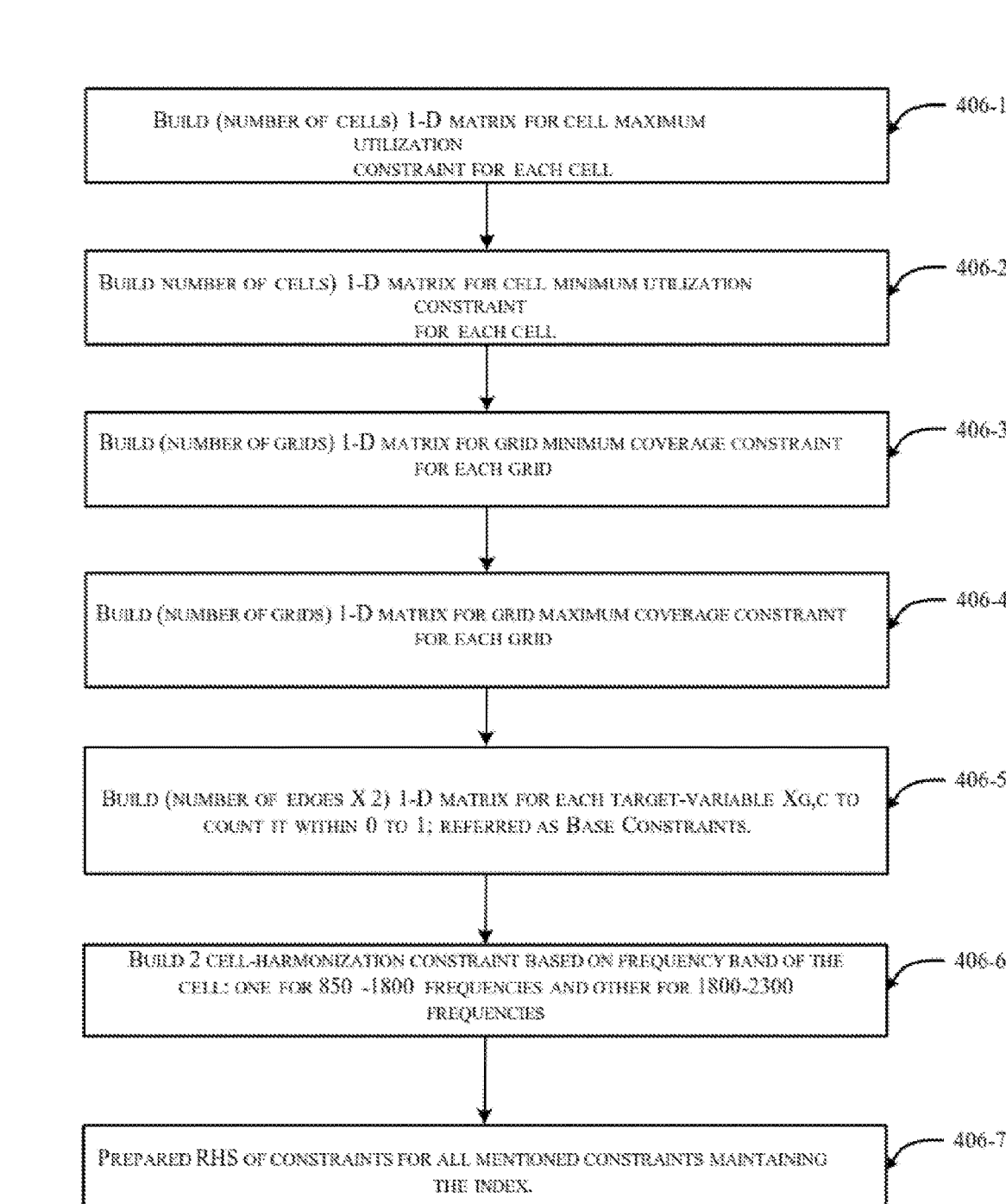

BUILD (NUMBER OF CELLS) 1-D MATRIX FOR CELL MAXIMUM
UTILIZATION
CONSTRAINT FOR EACH CELL 406-1

BUILD NUMBER OF CELLS) 1-D MATRIX FOR CELL MINIMUM UTILIZATION
CONSTRAINT
FOR EACH CELL 406-2

BUILD (NUMBER OF GRIDS) 1-D MATRIX FOR GRID MINIMUM COVERAGE CONSTRAINT
FOR EACH GRID 406-3

BUILD (NUMBER OF GRIDS) 1-D MATRIX FOR GRID MAXIMUM COVERAGE CONSTRAINT
FOR EACH GRID 406-4

BUILD (NUMBER OF EDGES X 2) 1-D MATRIX FOR EACH TARGET-VARIABLE $X_{G,C}$ TO
COUNT IT WITHIN 0 TO 1; REFERRED AS BASE CONSTRAINTS.

406-5

BUILD 2 CELL-HARMONIZATION CONSTRAINT BASED ON FREQUENCY BAND OF THE
CELL: ONE FOR 850 -1800 FREQUENCIES AND OTHER FOR 1800-2300
FREQUENCIES 406-6

PREPARED RHS OF CONSTRAINTS FOR ALL MENTIONED CONSTRAINTS MAINTAINING
THE INDEX.

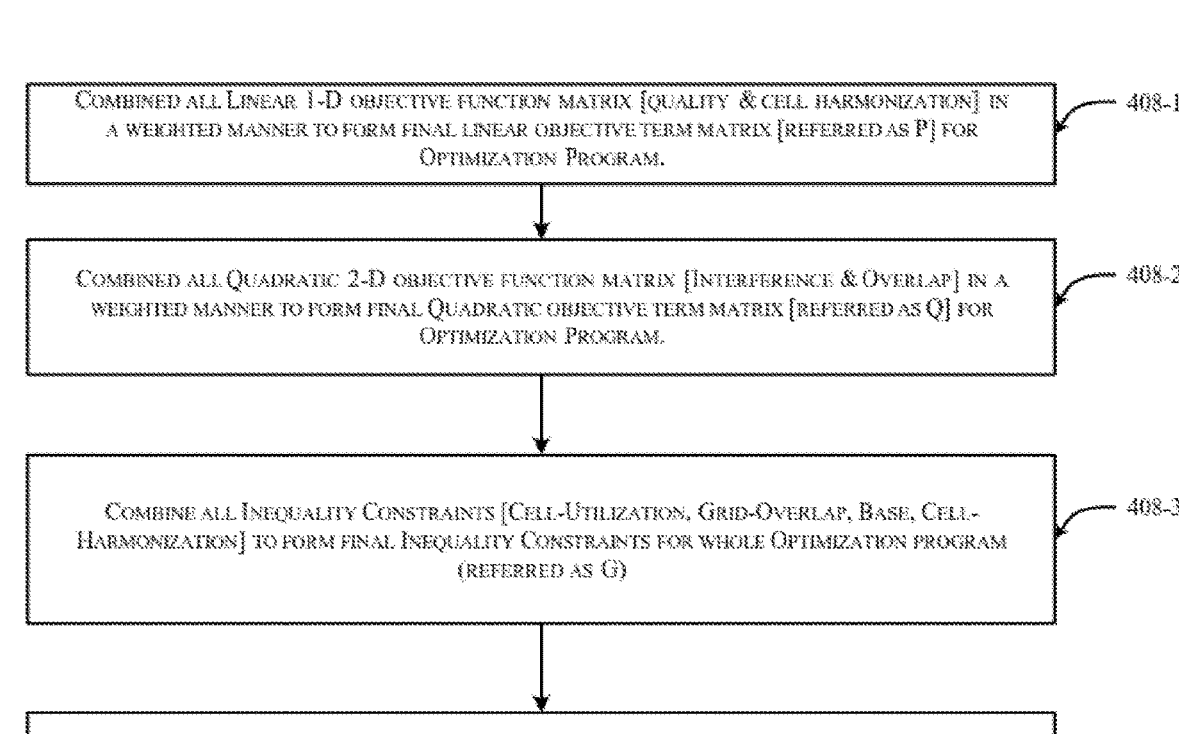

COMBINED ALL LINEAR 1-D OBJECTIVE FUNCTION MATRIX [QUALITY & CELL HARMONIZATION] IN A WEIGHTED MANNER TO FORM FINAL LINEAR OBJECTIVE TERM MATRIX [REFERRED AS P] FOR OPTIMIZATION PROGRAM. — 408-1

COMBINED ALL QUADRATIC 2-D OBJECTIVE FUNCTION MATRIX [INTERFERENCE & OVERLAP] IN A WEIGHTED MANNER TO FORM FINAL QUADRATIC OBJECTIVE TERM MATRIX [REFERRED AS Q] FOR OPTIMIZATION PROGRAM. — 408-2

COMBINE ALL INEQUALITY CONSTRAINTS [CELL-UTILIZATION, GRID-OVERLAP, BASE, CELL-HARMONIZATION] TO FORM FINAL INEQUALITY CONSTRAINTS FOR WHOLE OPTIMIZATION PROGRAM (REFERRED AS G) — 408-3

COMBINE ALL INEQUALITY CONSTRAINTS RHS [CELL-UTILIZATION, GRID-OVERLAP, BASE, CELL-HARMONIZATION] TO FORM FINAL INEQUALITY CONSTRAINTS RHS MATRIX (REFERRED AS H) FOR WHOLE OPTIMIZATION PROGRAM — 408-4

FEED PREPARED MATRIX TO THE QUADRATIC CONVEX PROGRAM SOLVER TO GET OPTIMAL VALUES OF TARGET VARIABLE ('OPTIMAL DEMAND FRACTION BETWEEN EACH CELL AND GRID') — 408-5

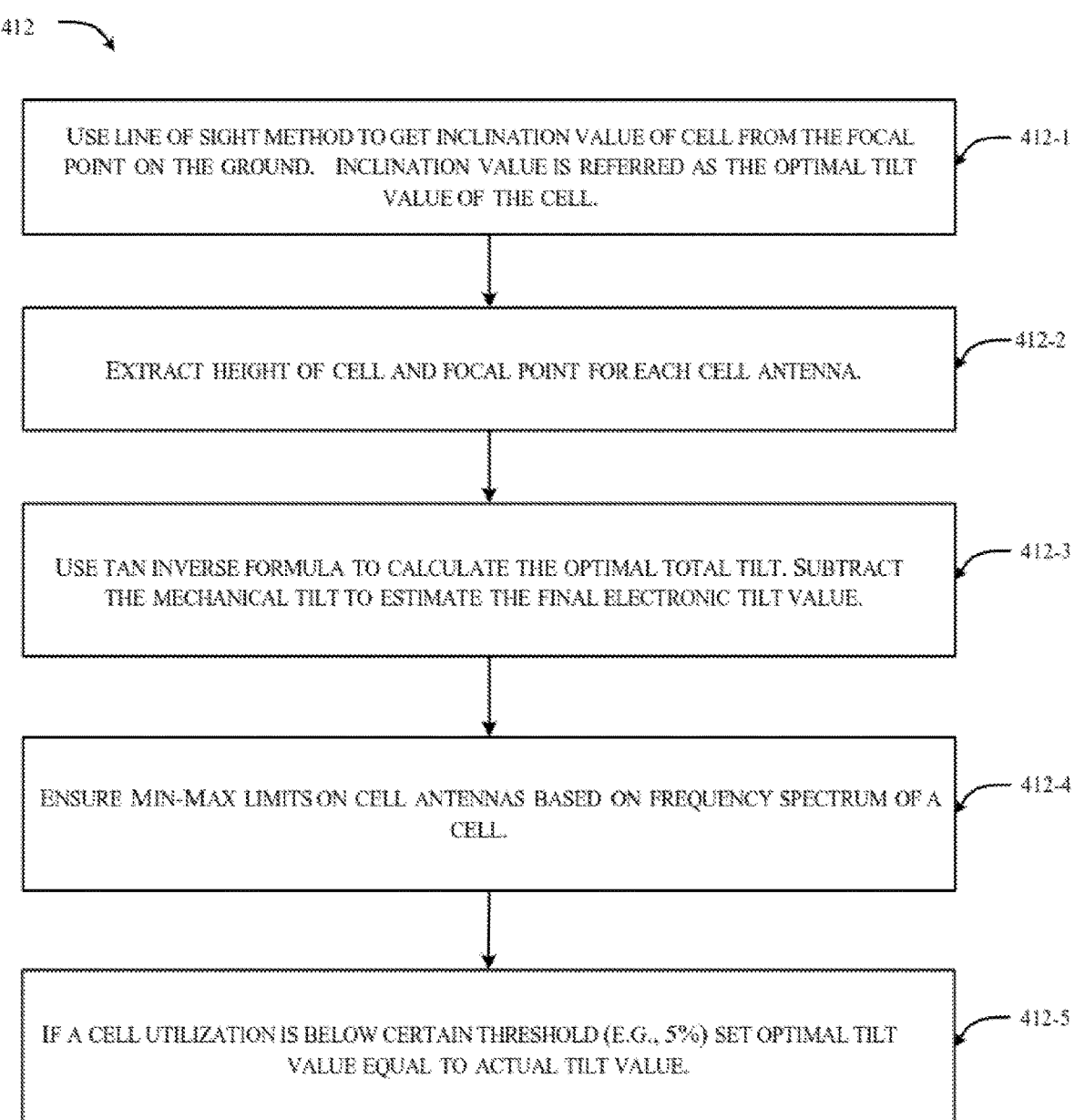

USE LINE OF SIGHT METHOD TO GET INCLINATION VALUE OF CELL FROM THE FOCAL POINT ON THE GROUND. INCLINATION VALUE IS REFERRED AS THE OPTIMAL TILT VALUE OF THE CELL. — 412-1

EXTRACT HEIGHT OF CELL AND FOCAL POINT FOR EACH CELL ANTENNA. — 412-2

USE TAN INVERSE FORMULA TO CALCULATE THE OPTIMAL TOTAL TILT. SUBTRACT THE MECHANICAL TILT TO ESTIMATE THE FINAL ELECTRONIC TILT VALUE. — 412-3

ENSURE MIN-MAX LIMITS ON CELL ANTENNAS BASED ON FREQUENCY SPECTRUM OF A CELL. — 412-4

IF A CELL UTILIZATION IS BELOW CERTAIN THRESHOLD (E.G., 5%) SET OPTIMAL TILT VALUE EQUAL TO ACTUAL TILT VALUE. — 412-5

FIG. 4G

|  | PRE | POST |  |  |
|---|---|---|---|---|
| SESSION SUCCESS RATE | 99.91 | 99.95 | △ | 0.04% |
| RRC CONNECTION SUCCESS RATE | 99.92 | 99.96 | △ | 0.04% |
| ERAB SUCCESS RATE | 99.97 | 99.98 | △ | 0.01% |
| HANDOVER SUCCESS RATE | 99.89 | 99.92 | △ | 0.03% |
| IP TROUGHTOUT | 3400 | 3600 | △ | 6.00% |
| AVERAGE CQI | 9.09 | 9.37 | △ | 3.00% |
| AVERAGE RSRP | -98.1 | -95.7 | △ | 3.00% |

$$\Theta = \tan^{-1}\left(\frac{Height}{Haversine\ Distance\ (LL(Focal\ Point) - LL(c))}\right)$$

SYSTEMS AND METHODS FOR OPTIMIZING SUPPLY DEMAND IN A TELECOMMUNICATION NETWORK

CROSS-REFERENCE TO RELATED APPLICATION(S)

This application is a National Stage of International Application No. PCT/IB2022/057108, filed on Aug. 1, 2022, which claims priority to Indian Patent Application No. 202121035614, filed Aug. 6, 2021, the disclosures of which are hereby incorporated by reference in their entirety.

FIELD OF INVENTION

The embodiment of the present disclosure generally relates to data analytics in wireless networks. More particularly, the present disclosure relates to systems and methods for optimizing supply demand in a telecommunication network.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In general, network analysis may be growing field across many domains. The growing use of digital communication devices and platforms may have resulted in explosion of the quantity of data and stretched the abilities of current technologies to process this data and draw meaningful conclusions. Elucidation of network structural organization, connectedness, and relevance in complex environments may represent a challenge for network analysis. Network facilities may include one or more wireless networks containing various wireless devices, and wireless telecommunication towers. Telecommunication cellular towers in the wireless networks may need to appropriately placed to improve cell coverage. This may be necessary or desirable for various reasons, such as improve network quality, coverage, and cell utilization, and to reduce interference on the network. This may lead to better user experience with respect to improved throughput and reduced number of dropped and/or mute calls.

Conventionally, the telecommunication cellular towers in a network may be planned manually and placed in several locations according to demand for the network. This may require manual effort and may also be less effective in terms of network quality, coverage, and cell utilization, and interference in the network.

Hence, there is a need to improve network quality, coverage, and cell utilization, optimize supply demand, reduce interference in the network, and so on. Therefore, there is a need in the art to provide systems and methods that can overcome the shortcomings of the existing prior art.

OBJECTS OF THE PRESENT DISCLOSURE

Some of the objects of the present disclosure, which at least one embodiment herein satisfies are as listed herein below.

An object of the present disclosure is to provide a robust, efficient, and effective systems and methods for optimizing supply demand in a telecommunication network.

An object of the present disclosure is to provide systems and methods for determining the optimal configuration (electronic tilt) of a cell using the data and Artificial Intelligence (AI) techniques, without manual effort to optimize the network.

An object of the present disclosure is to provide systems and methods for optimal user experience with the existing network infrastructure.

An object of the present disclosure is to provide systems and methods for use raw telecom data to prepare the data for optimization and estimate electronic tilt values ensuring the pre-defined guidelines An object of the present disclosure is to provide systems and methods for improving quality, coverage, cell utilization and reducing interference on the telecommunication network.

An object of the present disclosure is to provide systems and methods for improving network throughput and reduced number of dropped and mute calls.

An object of the present disclosure is to provide systems and methods for predicting hourly user demand with great precision to allocate a group of telecommunication cellular towers based on the capacity and quality of the telecommunication cellular towers.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for a system for optimizing supply demand in a network. The system may include a supply demand optimizing (SDO) device operatively coupled to one or more first computing devices and a second computing device. The one or more first computing devices may be associated with a plurality of cells. Each cell may further have a telecommunication tower. The SDO device may further include a processor that may execute a set of executable instructions that are stored in a memory upon execution of which the processor may cause the SDO device to receive, a set of data packets from the one or more first computing devices, the set of data packets pertaining to a set of telecom parameters associated with a plurality of cells. The SDO device may be further configured to extract, a first set of attributes from the received set of data packets, the first set of attributes pertaining to a demand, signal quality, longitude, latitude and allocability at a predefined grid associated with the plurality of cells. The SDO device may be configured to determine, based on the first set of attributes and on execution of a first set of instructions, an optimal cell harmonization index and compute, based on the optimal cell harmonization index and on execution of a second set of instructions, one or more inequality constraints associated with the plurality of cells. Furthermore, the SDO device may be configured to optimize, by an optimizer module, the set of data packets to enable a hyper parameter tuning of the set of telecom parameters and based on the one or more inequality constraints the cell harmonization index. Based on the hyper parameter tuning obtained and the extracted first set of attributes, the SDO device may be configured to determine a focal point of each cell.

In an embodiment, the processor may further configure the SDO device to extract an inclination value of each said cell based on the focal point of each cell, extract a height of a telecommunication tower associated with the cell; and based on the extracted inclination value, the focal and height of the telecommunication tower, determine an optimal electronic tilt value of each cell.

In an embodiment, the processor may further configure the SDO to determine a cell utilization based on a minimum and maximum limit set on the telecommunication towers. The minimum and maximum limit may be based on a frequency spectrum of each cell associated with the telecommunication towers. The processor may further configure the SDO to set the optimal electronic tilt value equal to an actual tilt value if the cell utilization is below a predefined threshold associated with the minimum or the maximum limit of the cell.

In an embodiment, the set of telecom parameters may include a geohash, one or more predefined Radio Resource Control (RRC) sessions, one or more edge properties, and a demand forecast at a predefined time interval associated with the plurality of cells.

In an embodiment, the processor may obtain the set of telecom parameters by configuring the SDO to: extract a user-cell session log from a local service request (LSR) for the plurality of cells and one or more grids associated with the plurality of cells, and aggregate, based on the user-cell session log, a user level data raw location data such as latitude and longitude into the geohash. The SDO may be further configured to aggregate one or more Radio Resource Control (RRC) sessions at a predefined time interval and compute quality, interference and demand for the predefined geohash, compare the one or more RRC sessions with a predefined quality and demand, and remove one or more RRC sessions below a pre-determined threshold data-volume and Quality based on the comparison of the one or more RRC sessions with the predefined quality and demand. Furthermore, the SDO may be configured to calculate one or more edge properties of the plurality of cells a; and predict a demand forecast at a predefined time interval based on the calculated one or more edge properties.

In an embodiment, the processor may cause the execution of the first set of instructions to obtain a cell harmonization index, prepare a first number of edges of the cell for a predefined quality value of the cell based on grid demand, signal quality, allocability, and prepare a second number of edges of the cell for a predefined interference value of the cell based on grid demand, cell frequency band, signal quality, allocability, scaling factor. Further, the processor may cause to prepare a third number of edges of the cell for a predefined overlap value of the cell based on grid demand, cell frequency band, signal quality, allocability, and prepare a fourth number of edges of the cell for the obtained cell harmonization index of the cell based on grid demand, band-weight, allocability, and based on the first, second, third, and fourth number of edges, the processor may determine an optimal cell harmonization index.

In an embodiment, the processor may cause the execution of the second set of instructions associated with the one or more inequality constraints to build a first number of cells for cell maximum utilization constraint for each cell, build a second number of cells for cell minimum utilization constraint for each cell; and then, based on the first and second number of cells, determine a cell utilization constraints for each cell, build a third number of cells for grid minimum coverage constraint for each grid. Further, the processor may cause the execution of the second set of instructions associated with the one or more inequality constraints to build a fourth number of cells for grid maximum coverage constraint for each grid and based on the third and fourth number of cells, determine a grid-utilization constraints for each cell. Furthermore, the processor may cause the execution of the second set of instructions associated with the one or more inequality constraints to build a set of edges for each grid demand fulfilled by each cell, based on the built first, second, third and fourth number of cells, build a cell-harmonization constraint based on frequency band of the cell; and based on the determined cell utilization constraints, grid utilization, cell harmonization constraints, determine the one or more inequality constraints of the cell.

In an embodiment, the processor may cause the optimizer module to: combine a quality and a cell harmonization of each cell in a weighted manner to obtain an optimized electronic tilt value for each cell and combine an Interference and an Overlap of each said cell in a weighted manner to obtain the optimized electronic tilt value for each said cell. The optimizer module may be further configured to combine one or more inequality constraints to obtain the optimized electronic tilt value for each cell and aggregate the quality, the cell harmonization, the interference, the overlap, the one or more inequalities, to obtain an optimal demand fraction between each cell and grid.

In an embodiment, a centralized server may be operatively coupled to the SDO device. The processor may cause the SDO device to send the optimal electronic value of the plurality of cells serving the predefined grid through a network. The centralized server may further store grid details, and the set of telecom parameters.

In an embodiment, the SDO device may be remotely monitored and the data, application and physical security is fully ensured.

In an aspect, the present disclosure provides for a method for optimizing supply demand in a network. The method may include the steps of receiving, by a supply demand optimizing SDO device, a set of data packets from the one or more first computing devices, the set of data packets pertaining to a set of telecom parameters associated with a plurality of cells. In an embodiment, the SDO device may be operatively coupled to one or more first computing devices and a second computing device. The one or more first computing devices may be associated with a plurality of cells, and each cell further may have a telecommunication tower. The SDO device may further include a processor that may execute a set of executable instructions that may be stored in a memory. The method may also include the steps of extracting, by the SDO device, a first set of attributes from the received set of data packets, the first set of attributes pertaining to a demand, signal quality, longitude, latitude and allocability at a predefined grid associated with the plurality of cells and determining, by the SDO device, based on the first set of attributes and on execution of a first set of instructions, an optimal cell harmonization index. The method may include the step of computing, by the SDO device, based on the optimal cell harmonization index and on execution of a second set of instructions, one or more inequality constraints associated with the plurality of cells. Furthermore, the method may include the steps of optimizing, by the SDO device, by an optimizer module, the set of data packets to enable a hyper parameter tuning of the set of telecom parameters and based on the one or more inequality constraints the cell harmonization index, and based on the hyper parameter tuning obtained and the extracted first set of attributes, determining, by the SDO device, a focal point of each cell.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 4A illustrates an exemplary flow chart depicting a method for optimizing supply demand in a network, in accordance with an embodiment of the present disclosure.

FIG. 4B illustrates an exemplary flow chart depicting a method for preparing data for supply demand optimization using telecommunication raw data, in accordance with an embodiment of the present disclosure.

FIG. 4C illustrates an exemplary flow chart depicting a method for building quadratic optimization objective function, in accordance with an embodiment of the present disclosure.

FIG. 4D illustrates an exemplary flow chart depicting a method for building quadratic program inequality constraints, in accordance with an embodiment of the present disclosure.

FIG. 4E illustrates an exemplary flow chart depicting a method for executing optimizer and finding optimal solution ensuring hyper-parameter tuning, in accordance with an embodiment of the present disclosure.

FIG. 4G illustrates an exemplary flow chart depicting a method for estimating electronic tilt values, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present invention provides a robust, efficient, and effective systems and methods for optimizing supply demand in a telecommunication network. The present disclosure provides systems and methods for determining the optimal configuration (electronic tilt) of a cell using the data and Artificial Intelligence (AI) techniques, without manual effort to optimize the network. The present disclosure provides systems and methods for optimal user experience with the existing network infrastructure. The present disclosure provides systems and methods for use raw telecom data to prepare the data for optimization and estimate electronic tilt values ensuring the pre-defined guidelines. The present disclosure provides systems and methods for improving quality, coverage, cell utilization and reducing interference on the telecommunication network. The present disclosure provides systems and methods for improving network throughput and reduced number of dropped and mute calls. The present disclosure provides systems and methods for predicting hourly user demand with great precision to allocate a group of telecommunication cellular towers based on the capacity and quality of the telecommunication cellular towers.

Figure 1:
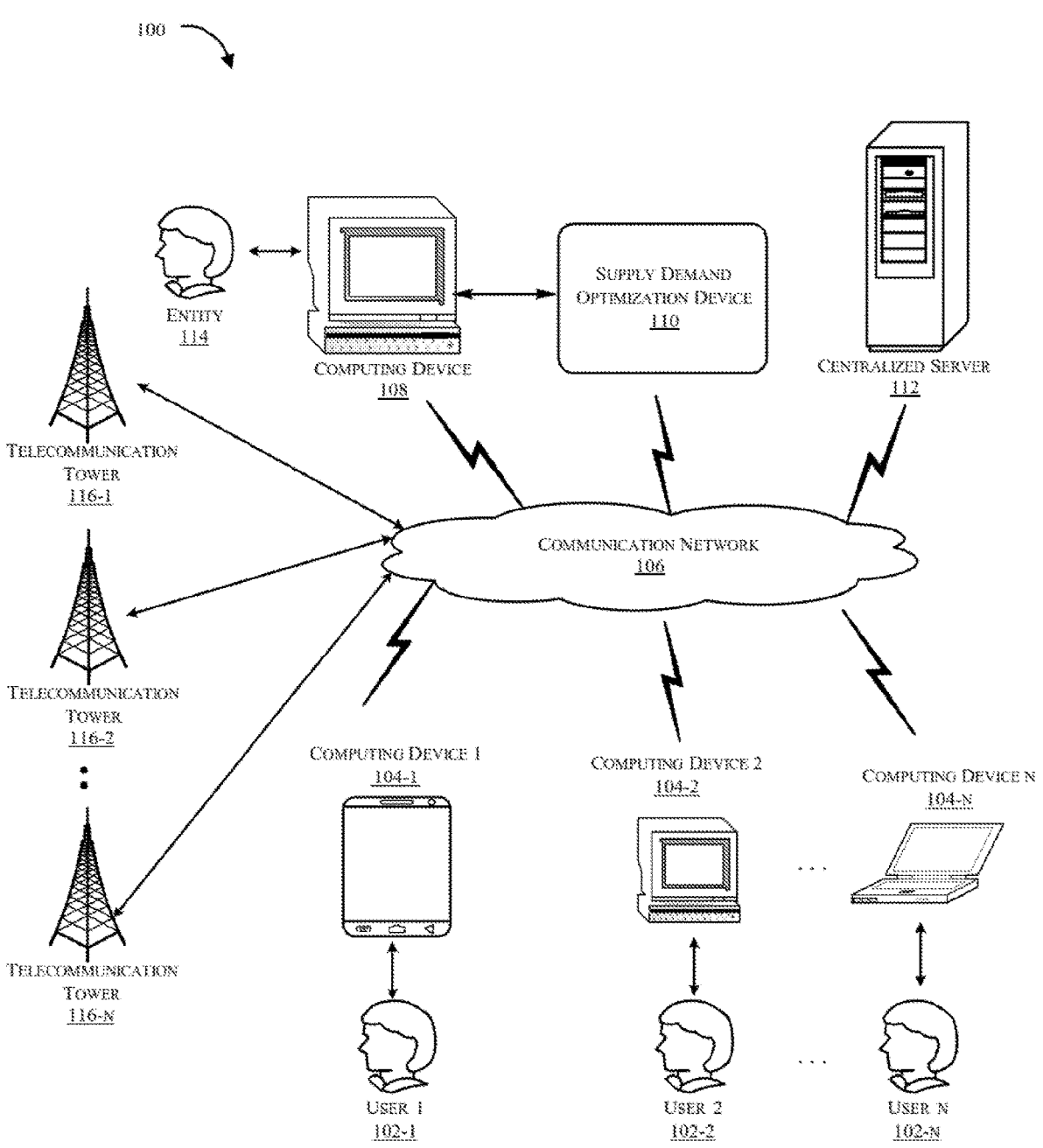
FIG. 1 illustrates an exemplary network architecture in which or with which proposed system of the present disclosure can be implemented, in accordance with an embodiment of the present disclosure.

Referring to FIG. 1 that illustrates an exemplary network architecture for a network supply demand optimization system (100) (also referred to as network architecture (100)) in which or with which a supply demand optimizing (SDO) device (110) or simply referred to as the system (110) of the present disclosure can be implemented, in accordance with an embodiment of the present disclosure. As illustrated, the exemplary architecture (100) may include telecommunication cellular towers (116-1, 116-2, 116-3, . . . , 116-N) (individually referred to as the telecommunication tower (116) and collectively referred to as the telecommunication towers (116)) communicatively coupled to users (102-1, 102-2, 102-3 . . . 102-N) (individually referred to as the user (102) and collectively referred to as the users (102)) associated with one or more first computing devices (104-1, 104-2 . . . 104-N) (individually referred to as the first computing device (104) and collectively referred to as the first computing devices (104)). The telecommunication towers (116), may be a cellular base station, where antennas and electronic communications equipment may be placed typically on a radio mast, tower, or other raised structure to create a cell (or adjacent cells) in a cellular network. The raised structure typically supports antenna and one or more sets of transmitters/receivers, transceivers, digital signal processors, control electronics, a GPS receiver for timing (for Code-division multiple access (CDMA)2000/IS-95 or Global System for Mobile communication (GSM) systems), primary and backup electrical power sources, and sheltering. A cellular network may be a network of the first computing devices (104) in which each first computing device (104) communicates with the telephone network by radio waves through the telecommunication towers (116). The coverage area in which service is provided may be divided into a mosaic of small geographical areas called "cells", each served by a separate low power multichannel transceiver and telecommunication towers (116) at a base station. A cell is a geographic area that is covered by a single base station in a cellular network. While, a "sector" refers to a specific sector emanating from a telecommunication tower. The number of sectors around a cell tower may vary by cellular provider but typically involve three separate 120-degree, pie-shaped arcs connected to form a circle of 360-degree coverage around the cell tower. A grid is a complex, multitiered network-of-networks that can manage and integrate diverse technologies and facilitate the rapid, seamless flow of information. For example, at the top of the grid telecommunications hierarchy are wide area networks (WAN). The telecommunication towers (116) may be located at the edge of one or more cells and covers multiple cells using directional antennas. A common geometry is to locate the cell site at the intersection of three adjacent cells, with three antennas at 120° angles each covering one cell.

As illustrated, the exemplary architecture (100) may be equipped with the supply demand optimizing device (110)/ system (110) for facilitating optimal demand and supply in a network to a second computing device (108) associated with an entity (114). The entity (114) may include a company, an organization, a university, a lab facility, a business enterprise, a defense facility, or any other secured facility. In some implementations, the system (110) may also be associated with the second computing device (108). Further, the system (110) may also be communicatively coupled to the one or more first computing devices (104) via a communication network (106).

The system (110) may be coupled to a centralized server (112). The centralized server (112) may also be operatively coupled to the one or more first computing devices (104) and the second computing devices (108) through the communication network (106). In some implementations, the system (110) may also be associated with the centralized server (112).

In an embodiment, the system (110) may prepare the data for optimization using raw telecom data. The telecom data may include, but not limited to, user-cell session log from local service request (LSR) for a selected group of cells and grids, and the like.

In an embodiment, the processor obtains the set of telecom parameters by configuring the SDO (110) to:

extract a user-cell session log from a local service request (LSR) for the plurality of cells and one or more grids associated with the plurality of cells;

aggregate, based on the user-cell session log, a user level data raw location data such as latitude and longitude into the geohash;

aggregate one or more Radio Resource Control (RRC) sessions at a predefined time interval and compute quality, interference and demand for the predefined geohash;

compare the one or more RRC sessions with a predefined quality and demand;

remove one or more RRC sessions below a pre-determined threshold data-volume and Quality based on the comparison of the one or more RRC sessions with the predefined quality and demand;

calculate one or more edge properties of the plurality of cells; and predict a demand forecast at a predefined time interval based on the calculated one or more edge properties.

In an embodiment, the system (110) may execute a first set of instructions (also referred to as a quadratic optimization objective function herein) by reading index table that may include a cell-grid information. In an embodiment, the processor may cause the execution of the first set of instructions to:

obtain a cell harmonization index;

prepare a first number of edges of the cell for a predefined quality value of the cell based on grid demand, signal quality, allocability;

prepare a second number of edges of the cell for a predefined interference value of the cell based on grid demand, cell frequency band, signal quality, allocability, scaling factor;

prepare a third number of edges of the cell for a predefined overlap value of the cell based on grid demand, cell frequency band, signal quality, allocability;

prepare a fourth number of edges of the cell for the obtained cell harmonization index of the cell based on grid demand, band-weight, allocability;

based on the first, second, third, and fourth number of edges, determine an optimal cell harmonization index.

In an embodiment, the system (110) may execute a second set of instructions (also referred to as quadratic program inequality constraints hereinafter). The system (110) may prepare right hand side of constraints for all mentioned constraints maintaining the index. The processor may cause the execution of the second set of instructions associated with the one or more inequality constraints to:

build a first number of cells for cell maximum utilization constraint for each cell;

build a second number of cells for cell minimum utilization constraint for each cell;

based on the first and second number of cells, determine
a cell utilization constraints for each cell;

build a third number of cells for grid minimum coverage
constraint for each grid;

build a fourth number of cells for grid maximum coverage
constraint for each grid;

based on the third and fourth number of cells, determine
a grid utilization constraints for each cell;

build a set of edges for each grid demand fulfilled by each
said cell;

based on the built first, second, third and fourth number of
cells, build a cell-harmonization constraint based on
frequency band of the cell;

based on the determined cell utilization constraints, grid
utilization, cell harmonization constraints, determine
the one or more inequality constraints of the cell.

In an embodiment, the system (110) may execute an optimizer by an optimizer module and find the optimal solution ensuring hyper-parameter tuning. In an embodiment, the execution of the optimizer may include:

combine a quality and a cell harmonization of each cell in
a weighted manner to obtain an optimized electronic tilt
value for each cell;

combine an Interference and an Overlap of each said cell
in a weighted manner to obtain the optimized electronic
tilt value for each said cell;

combine one or more inequality constraints to obtain an
optimized electronic tilt value for each said cell;

aggregate the quality, the cell harmonization, the inter-
ference, the overlap, the one or more inequalities, to
obtain an optimal demand fraction between each cell
and grid.

In an embodiment, the system (110) may calculate focal point of each cell using a cell-grid allocation vector.

In an embodiment, the system (110) may estimate electronic tilt values (i.e., Remote Electrical Tilt (RET)) ensuring the business guidelines. The system (110) may use line of sight method to get inclination value of cell from the focal point on the ground. Inclination value may be referred as the optimal tilt value of the cell.

In an embodiment, the system (110) may be a System on Chip (SoC) system but not limited to the like. In another embodiment, an onsite data capture, storage, matching, processing, decision-making and actuation logic may be coded using Micro-Services Architecture (MSA) but not limited to it. A plurality of microservices may be containerized and may be event based in order to support portability.

In an embodiment, the network architecture (100) may be modular and flexible to accommodate any kind of changes in the system (110) as proximate processing may be acquired towards determining spatial clusters in the network. The system (110) configuration details can be modified on the fly.

In an embodiment, the system (110) may be remotely monitored and the data, application, and physical security of the system (110) may be fully ensured. In an embodiment, the data may get collected meticulously and deposited in a cloud-based data lake to be processed to extract actionable insights. Therefore, the aspect of predictive maintenance can be accomplished.

In an exemplary embodiment, the communication network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In another exemplary embodiment, the centralized server (112) may be included in architecture (100). The centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an embodiment, the one or more first computing devices (104) and the second computing device (108) may communicate with the system (110) via set of executable instructions residing on any operating system, including but not limited to, Android™, iOS™, Kai OS™, and the like. In an embodiment, one or more first computing devices (104) and the second computing device (108) may include, but not limited to, any electrical, electronic, electro-mechanical or an equipment or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more first computing devices (104), and the second computing device (108) may not be restricted to the mentioned devices and various other devices may be used. A smart computing device may be one of the appropriate systems for storing data and other private/sensitive information.

Figure 2:
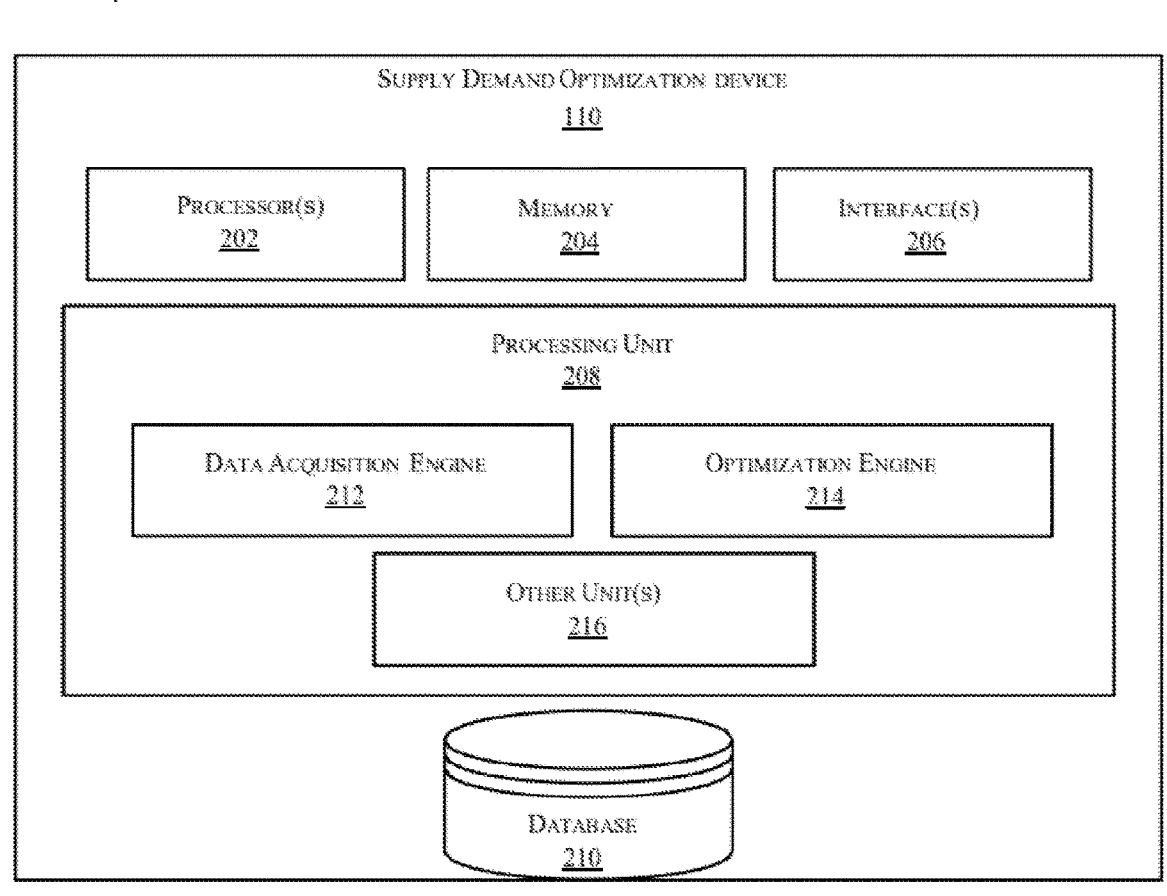
FIG. 2 illustrates an exemplary representation of proposed supply demand optimizing system/centralized server for optimizing supply demand in a telecommunication network, in accordance with an embodiment of the present disclosure.

FIG. 2 illustrates an exemplary representation of the proposed SDO device (110) for determining spatial clusters in the network, in accordance with an embodiment of the present disclosure. In an aspect, the system (110) may include one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) 206. The interface(s) (206) may comprise a variety of interfaces, for example, interfaces for data input and output devices, referred to as I/O devices, storage devices, and the like. The interface(s) (206) may facilitate communication of the system (110). The interface(s) (206) may also provide a communication pathway for one or more components of the system (110) or the centralized server (112). Examples of such components include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry. Further, the system (110) may include Machine Learning (ML) modules.

The processing engine (208) may include one or more engines selected from any of a data acquisition engine (212), optimization engine (214), and other engines (216). The data acquisition engine (212), optimization acquisition engine (214) may include a Machine Learning (ML) and/or Artificial Intelligence (AI) modules. The processing engine (208) may further perform edge based micro service event processing but not limited to the like. The other engines (216) may include a signal processing engine, an optimizer module and the like.

Figure 3A:
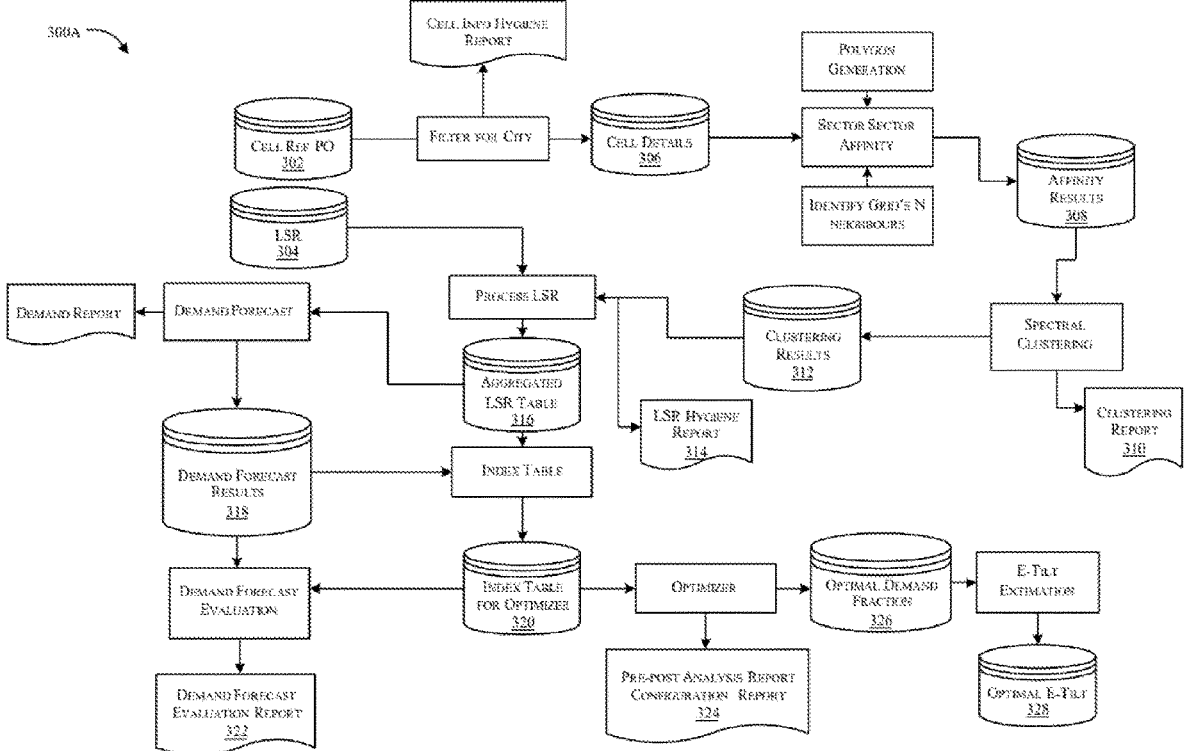
FIG. 3A illustrates an exemplary block diagram representation of a system architecture, in accordance with an embodiment of the present disclosure.

FIG. 3A illustrates an exemplary block diagram representation of a system architecture (300A), in accordance with an embodiment of the present disclosure.

In an embodiment, a cell reference PO (302) may be used and filter city from the cell reference PO. The filtered city details may be used for providing cell information hygiene report. The filtered city details may also be used to produce cell details (306). The cell details (306) may be used for determining sector-sector affinity upon providing polygon generation and identify grid's N neighbors. The sector-sector affinity may produce affinity results (308). The affinity results (308) may be used for producing spectral clustering and the clustering report (310). A clustering results (312) may be produced from the spectral clustering data.

Further, a system such as system (110) of the system architecture (300A) may extract telecommunication data (user-cell session log from LSR (304)) for the selected group of cells and grids. Using the clustering results (312) and the user-cell session log from LSR (304), the system (110) may process the LSR (304), to provide an aggregated LSR table (316). The aggregated LSR table (316) may be based on aggregating user level data raw location data (latitude, longitude) into quantized location i.e., Geohash, and aggregating cell-grid Radio Resource Control (RRC) sessions at hour level and compute quality, interference, and demand. The system (110) may remove the RRC sessions with no value for quality and demand and those RRC sessions which are below threshold data-volume and Quality Reference Signal Received Power (RSRP). Further, the system (110) may calculate aggregated various edge properties i.e., historical demand, demand-cluster-coefficient (demand of grid served by this group of cells), predicted demand of the grid. Furthermore, the system (110) may extract hourly peak demand forecasts for all the grids from the demand forecasting APIs. Thereafter, the system (110) may add all the above results in one matrix to prepare the data for optimization.

In an embodiment, the system (110) may execute a first set of instructions (also referred to quadratic optimization objective function). Further, the system (110) may read index table (cell-grid information) and prepare 1-D matrix of shape (1, number of edges) for overall quality in objective function using following information—grid demand, signal quality, allocability. The system (110) may populate normalized 2-D matrix of shape (number of edges, number of edges) for overall Interference in objective function using following—grid demand, cell frequency band, signal quality, allocability, scaling factor [beta]. Furthermore, the system (110) may populate normalized a 2-D matrix of shape number of edges, number of edges) for overall Overlap of cells in objective function using following information—grid demand, cell frequency band, signal quality, allocability. Thereafter, the system (110) may prepare 1-D matrix of shape (1, number of edges) for cell harmonization in objective function using information such as grid demand, band-weight, allocability, according to equation 1 below:

$$\max_{X} J(X \mid \theta) = \sum_{g} d_g [Q_g(X) - \qquad \text{Equation 1}$$

$$\lambda_1 I_g(X) + \lambda_2 O_g(X) + \lambda_3 \phi_g(X) - \lambda_4 D_g(X) - \lambda_5 T_g(X)]$$

In the above equation 1, the term "dg" may refer to demand at grid 'g', the term "xg,c may refer to percentage of grid g's demand fulfilled by cell 'c'. Other equations are equations 2, 3, 4, 5 and 6 as shown below:

$$Q_g(X) = \sum_{c \in CC} a_{g,c} \times x_{g,c} \times \hat{q}_{g,c}, \; \forall \; g \in CC \qquad \text{Equation 2}$$

$$\hat{q}_{g,c} = \frac{\lfloor ((q_{g,c} - q_{min}) / Bin) \rfloor}{q_{max} - q_{min}) / Bin} \qquad \text{Equation 3}$$

$$I_g(X) = \frac{\sum_c \sum_{c'} a_{g,c} a_{g,c'} \left( \frac{1}{\beta + (q_{g,c} - q_{g,c'})^2} \right) (x_{g,c} \times x_{g,c'})}{\sum_c \sum_{c'} a_{g,c} a_{g,c'} I(freq(c) = freq(c'))} \qquad \text{Equation 4}$$

$$O_g(X) = \frac{\sum_c \sum_{c'} a_{g,c} a_{g,c'} \left( \frac{1}{\beta + (q_{g,c} - q_{g,c'})^2} \right) I(freq(c) \neq freq(c')) (x_{g,c} \times x_{g,c'})}{\sum_c \sum_{c'} a_{g,c} a_{g,c'} I(freq(c) \neq freq(c'))} \qquad \text{Equation 5}$$

13

-continued $$\phi_g(X) = \frac{\sum_c x_{g,c} W_{g,c}}{\sum_c W_{g,c}}$$

Equation 6

$$D_g(X) = \sum_{c \in CC} \max\{(ta - k \times isd), 0\} \times a_{g,c} \times x_{g,c}, \forall\, g \in CC$$

Equation 6a $$T_g(X) = \sum_{c \in CC} \text{abs}\{t_p - t_o\} \times a_{g,c}^T \times x_{g,c}, \forall\, g \in CC$$

Equation 6B

In an embodiment, the system (110) may execute a second set of instructions (also referred to as a quadratic program inequality constraint hereinafter) and build (number of cells) 1-D matrix for cell maximum utilization constraint for each cell. Further, the system (110) may build number of cells) 1-D matrix for cell minimum utilization constraint for each cell, and build (number of grids) 1-D matrix for grid minimum coverage constraint for each grid. Furthermore, the system (110) may build (number of grids) 1-D matrix for grid maximum coverage constraint for each grid, and build (number of edges X 2) 1-D matrix for each target-variable xg,c to count it within 0 to 1; referred as Base Constraints. Thereafter, the system (110) may build 2 cell-harmonization constraints based on frequency band of the cell: one for 850-1800 frequencies and other for 1800-2300 frequencies. Further, the system (110) may prepare right hand side of constraints for all mentioned constraints maintaining the index. The cell utilization constraint ensuring maximum utilization on all the cells may be provided in equation 7 below.

$$U_c(X) = [\Sigma_{g \in c} a_{g,c}(d_g x_{g,c})] \leq \theta \times s_c, \forall c \in CCb$$

Equation 7

Further, the grid coverage constraints, ensuring full coverage on all the grids may be provided in equation 8 below.

$$V_g(X) = [\Sigma_{c \in g} a_{g,c} x_{g,c}] 1, \forall g \in CC$$

Equation 8

Furthermore, the cell harmonization for 850-1800 frequencies may be provided in equation 9 below.

$$\left( \frac{\sum_c = 850\, x_{g,c} \phi_{g,c}}{\sum_c = 850\, \phi_{g,c}} - \frac{\sum_c = 1800\, x_{g,c} \phi_{g,c}}{\sum_c = 1800\, \phi_{g,c}} \right) > 0$$

Equation 9

Thereafter, cell harmonization for 2300-1800 frequencies may be provided in equation 10 below.

$$\left( \frac{\sum_c = 1800\, x_{g,c} \phi_{g,c}}{\sum_c = 1800\, \phi_{g,c}} - \frac{\sum_c = 2300\, x_{g,c} \phi_{g,c}}{\sum_c = 2300\, \phi_{g,c}} \right) > 0$$

Equation 10

A demand forecast results (318) may be provided based on the demand forecast from the aggregated LSR table (316). The demand forecast results (318) may be provided to the index table. The index table may be provided to the optimizer (320). Further, a demand forecast evaluation may be produced form the index table and consequently a demand forecast evaluation report (322).

In an embodiment, the system (110) may execute optimizer (320) and find the optimal solution ensuring hyperparameter tuning. The system (110) may combine all linear 1-D objective function matrix [quality & cell harmonization] in a weighted manner to form final linear objective term matrix [referred as P] for optimization program. Further, the system (110) may combine all quadratic 2-D objective function matrix [interference and overlap] in a weighted manner to form final quadratic objective term matrix [referred as Q] for optimization program. Furthermore, the system (110) may combine all inequality constraints [cell-utilization, grid-overlap, base, cell-harmonization] to form final inequality constraints for whole optimization program (referred as G). Thereafter, the system (110) may combine all inequality constraints RHS [cell-utilization, grid-overlap, base, cell-harmonization] to form final inequality constraints RHS matrix (referred as h) for whole optimization program as shown in below equation 11. The system (110) may feed prepared matrix to the quadratic convex program solver to get optimal values of target variable ('optimal demand fraction (326) between each cell and grid').

$$\min_x\ \frac{1}{2}x^T Px + q^T x$$

$$\text{subject to} \quad Gx \leq h$$
$$Ax = b$$

Equation 11

A pre-post analysis report configuration report (3240 may be generated form the optimizer (320). Further, the system (110) may calculate focal point of each cell using cell-grid allocation vector and read the optimal solution from optimization process as depicted in FIG. 6B. The system (110) may get latitude and longitude of for all grids involved using geohash decoding method. Furthermore, the system (110) may calculate the demand weighted mean latitude and longitude of all coved grids for each cell, will be referred as focal point of the cell as shown in equation 12 below.

$$FocalPoint(c) = \frac{\sum_{g \in c} a_{g,c}\left(x_{g,c}^* d_g\right) LL(g)}{\sum_{g \in c} a_{g,c}\left(x_{g,c}^* d_g\right)}$$

Equation 12

In an embodiment, the system (110) may estimate electronic tilt values (RET) ensuring the pre-defined guidelines. The system (110) may use line of sight method to get inclination value of cell from the focal point on the ground. Inclination value may be referred as the optimal tilt value of the cell (328). The system (110) may extract height of cell and focal point for each cell antenna. Using tan inverse formula as show in below equation 13, the system (110) may calculate the optimal total tilt. Subtract the mechanical tilt to estimate the final electronic tilt value. Further, the system (110) may ensure minimum-maximum limits on cell antennas based on frequency spectrum of a cell. If a cell utilization is below certain threshold (e.g., 5%) set optimal tilt value equal to actual tilt value as depicted in FIG. 6C.

Equation 13

$$\Theta = \tan^{-1}\left( \frac{Height}{HaversineDistance\,(LL(FocalPoint) - LL(c))} \right)$$

Figure 3B:
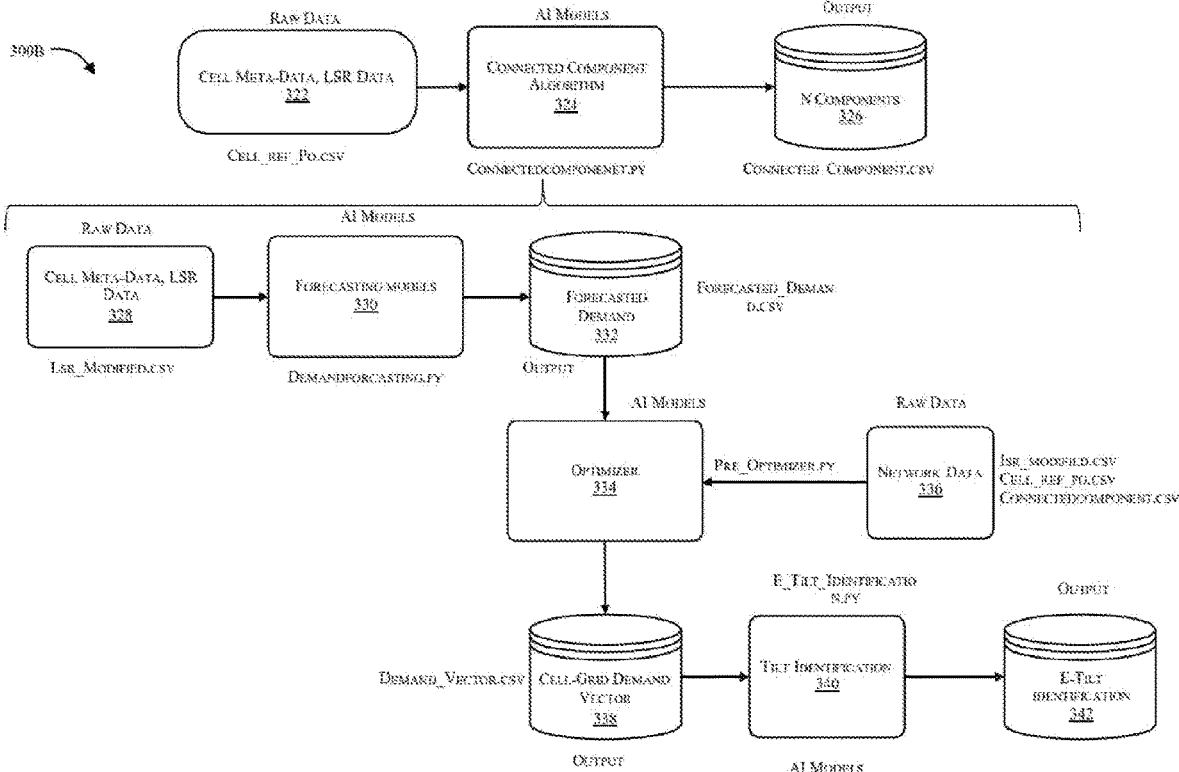
FIG. 3B illustrates an exemplary block diagram representation of a high-level system architecture, in accordance with an embodiment of the present disclosure.

FIG. 3B illustrates an exemplary block diagram representation of a high-level system architecture (300B), in accordance with an embodiment of the present disclosure.

The high-level system architecture (300B) may receive raw data such as cell meta data LSR data (322) as cell reference PO to provide to AI model such as connected component algorithm (324). The output of the AI model may be N components (326). The high-level system architecture (300B) may be further divided into different operation as described below.

Further, the raw data such as cell meta data LSR data (328) as LSR modified data, to provide to AI model such as a forecasting model (330). The forecasting model (330) may output a forecasted demand (332). The forecasted demand (332) may be provided to AI model such as optimizer (334). The optimizer (334) may receive raw data such as network data (336) which includes ISR modified data, cell reference PO data, and connected component data.

Further, the optimizer (334) may output cell grid demand vector (338) as a demand vector. The cell grid demand vector (338) may be provided to AI model such as tilt identification (340), which further provides output of electronic tilt (e-tilt) identification (342).

FIG. 4A illustrates an exemplary flow chart depicting a method (400) for optimizing supply demand in a network, in accordance with an embodiment of the present disclosure.

At block (400-1), the method (400) may include utilizing, by the processor (202), raw telecom data to prepare the data for optimization. At block (400-2), the method (400) may include identifying, by the processor (202), building quadratic convex optimization objective function. At block (400-3), the method (400) may include building, by the processor (202), quadratic program inequality constraints. At block (400-4), the method (400) may include executing, by the processor (202), optimizer and find optimal solution ensuring hyper parameter tuning.

At block (400-5), the method (400) may include calculating, by the processor (202), focal point of each cell using cell-grid allocation vector. At block (400-6), the method (400) may include estimating, by the processor (202), electronic tilt values (RET) ensuring the business guidelines.

FIG. 4B illustrates an exemplary flow chart depicting a method (402) for preparing data for supply demand optimization using telecommunication raw data, in accordance with an embodiment of the present disclosure.

At block (402-1), the method (402) may include extracting, by the processor (202), telecom data (user-cell session log from LSR) for the selected group of cells and grids. At block (402-2), the method (402) may include aggregating, by the processor (202), user level data raw location data (latitude, longitude) into quantized location i.e., Geohash. At block (402-3), the method (402) may include aggregating, by the processor (202), cell-grid RRC sessions at hour level and compute quality, interference, and demand. At block (402-4), the method (402) may include removing, by the processor (202), the RRC sessions with no value for quality and demand and also those RRC sessions which are below threshold data-volume and Quality (RSRP). At block (402-5), the method (402) may include calculating, by the processor (202), aggregated various edge properties i.e., historical demand, demand-cluster-coefficient (demand of grid served by this group of cells), predicted demand of the grid. At block (402-6), the method (402) may include extracting, by the processor (202), hourly peak demand forecasts for all the grids from the demand forecasting APIs. At block (402-7), the method (402) may include adding, by the processor (202), all the above results in one matrix to prepare the data for optimization.

FIG. 4C illustrates an exemplary flow chart depicting a method (404) for building quadratic optimization objective function, in accordance with an embodiment of the present disclosure.

At block (404-1), the method (404) may include reading, by the processor (202), index table (cell-grid information).

At block (404), the method (404-2) may include preparing, by the processor (202), 1-D matrix of shape (1, number of edges) for overall quality in objective function using information such as grid demand, signal quality, allocability. At block (404-3), the method (404) may include, populating, by the processor (202), normalized 2-D matrix of shape (number of edges, number of edges) for overall Interference in objective function using grid demand, cell frequency band, signal quality, allocability, scaling factor[beta]. At block (404-4), the method (404) may include, populating, by the processor (202), normalized a 2-D matrix of shape number of edges, number of edges) for overall Overlap of cells in objective function using information such as grid demand, cell frequency band, signal quality, allocability. At block (404-5), the method (404) may include preparing, by the processor (202), 1-D matrix of shape (1, number of edges) for cell harmonization in objective function using information such as grid demand, band-weight, allocability.

FIG. 4D illustrates an exemplary flow chart depicting a method (406) for building quadratic program inequality constraints, in accordance with an embodiment of the present disclosure.

At block (406-1), the method (406) may include, building, by the processor (202), (number of cells) 1-D matrix for cell maximum utilization constraint for each cell. At block (406-2), the method (406) may include building, by the processor (202), (number of cells) 1-D matrix for cell minimum utilization constraint for each cell. At block (406-3), the method (406) may include building, by the processor (202), (number of grids) 1-D matrix for grid minimum coverage constraint for each grid. At block (406-4), the method (406) may include building, by the processor (202), (number of grids) 1-D matrix for grid maximum coverage constraint for each grid. At block (406-5), the method (406) may include building, by the processor (202), (number of edges X 2) 1-D matrix for each target-variable xg,c to count it within 0 to 1, referred as base constraints. At block (406-6), the method (406) may include building by the processor (202), 2 cell-harmonization constraints based on frequency band of the cell, one for 850-1800 frequencies and other for 1800-2300 frequencies. At block (406-7), the method (406) may include preparing by the processor (202), RHS of constraints for all mentioned constraints maintaining the index.

FIG. 4E illustrates an exemplary flow chart depicting a method (408) for executing optimizer and finding optimal solution ensuring hyper-parameter tuning, in accordance with an embodiment of the present disclosure.

At block (408-1), the method (408) may include combining, by the processor (202), all linear 1-D objective function matrix [quality & cell harmonization] in a weighted manner to form final linear objective term matrix [referred as P] for optimization program. At block (408-2), the method (408) may include combining, by the processor (202), all quadratic 2-D objective function matrix [Interference & Overlap] in a weighted manner to form final quadratic objective term matrix [referred as Q] for optimization program. At block (408-3), the method (408) may include combining, by the processor (202), all Inequality Constraints [cell-utilization, grid-overlap, base, cell-harmonization] to form final inequality constraints for whole optimization program (referred as G). At block (408-4), the method (408) may include combining, by the processor (202), all Inequality constraints RHS [cell-utilization, grid-overlap, base, cell-harmonization] to form final inequality constraints RHS matrix (referred as h) for whole optimization program. At block (408-5), the method (408) may include feeding, by the processor (202), prepared matrix to the quadratic convex program solver to get optimal values of target variable ('optimal demand fraction between each cell and grid').

Figure 4F:
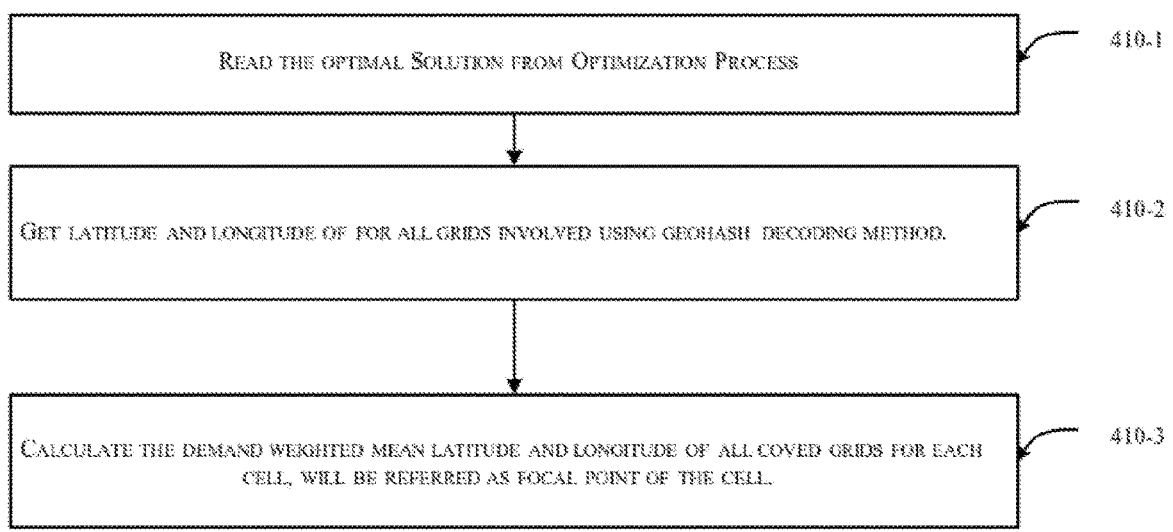
FIG. 4F illustrates an exemplary flow chart depicting a method for calculating focal point of each cell using cell-grid allocation vector, in accordance with an embodiment of the present disclosure.

FIG. 4F illustrates an exemplary flow chart depicting a method (410) for calculating focal point of each cell using cell-grid allocation vector, in accordance with an embodiment of the present disclosure.

At block (410-1), the method (410) may include reading, by the processor (202), the optimal solution from optimization process. At block (410-2), the method (410) may include obtaining, by the processor (202), latitude and longitude of for all grids involved using geohash decoding method. At block (410-3), the method (410) may include calculating, by the processor (202), the demand weighted mean latitude and longitude of all coved grids for each cell, will be referred as focal point of the cell.

FIG. 4G illustrates an exemplary flow chart depicting a method (412) for estimating electronic tilt values, in accordance with an embodiment of the present disclosure.

At block (412-1), the method (412) may include using, by the processor (202), line of sight method to get inclination value of cell from the focal point on the ground. Inclination value may be referred as the optimal tilt value of the cell. At block (412-2), the method (410) may include extracting, by the processor (202), height of cell and focal point for each cell antenna. At block (412-3), the method (412) may include using, by the processor (202), tan inverse formula to calculate the optimal total tilt. Subtract the mechanical tilt to estimate the final electronic tilt value. At block (412-4), the method (412) may include ensuring, by the processor (202), minimum-maximum limits on cell antennas based on frequency spectrum of a cell. At block (412-5), the method (412) may include setting, by the processor (202), if a cell utilization is below certain threshold (e.g., 5%), optimal tilt value equal to actual tilt value.

Figures 5A, 5B:
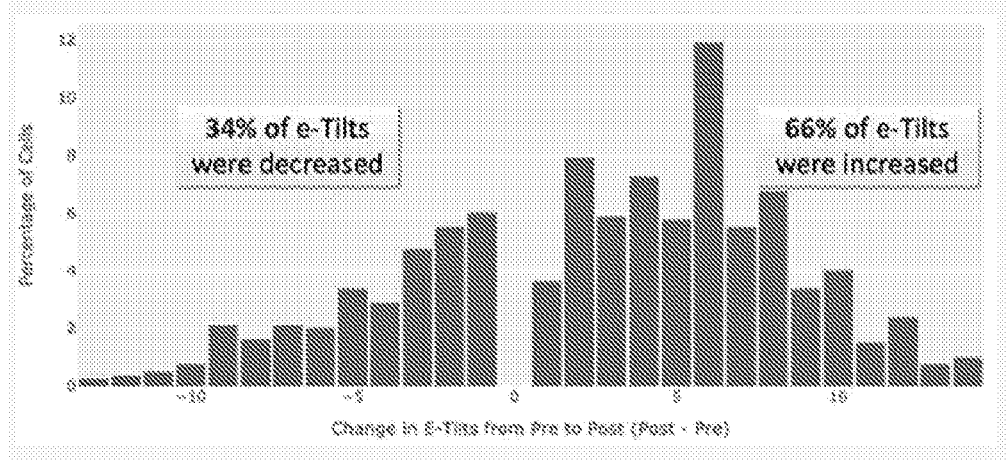
FIG. 5A illustrates an exemplary table representation of results of validation of systems and methods for optimizing supply demand in the network, in accordance with an embodiment of the present disclosure.
FIG. 5B illustrates a graphical representation of change in electronic tilts of the telecommunication towers, in accordance with an embodiment of the present disclosure.

FIG. 5A illustrates an exemplary table representation of results of validation of systems and methods for optimizing supply demand in the network, in accordance with an embodiment of the present disclosure.

Based on the validation of AI models by performing PoC in the field for a cluster in rural site of exemplary area, the success rate may be provided in the table of FIG. 5A.

FIG. 5B illustrates a graphical representation of change in electronic tilts of the telecommunication towers, in accordance with an embodiment of the present disclosure.

In the graph, the x-axis may include change in E-tilts from pre to post, and the y-axis may include percentage of cells. As depicted in graph, 34 percentage of electronic tilts (e-tilts) may be decreased, 66 percentage of e-tilts may be decreased.

Figure 5C:
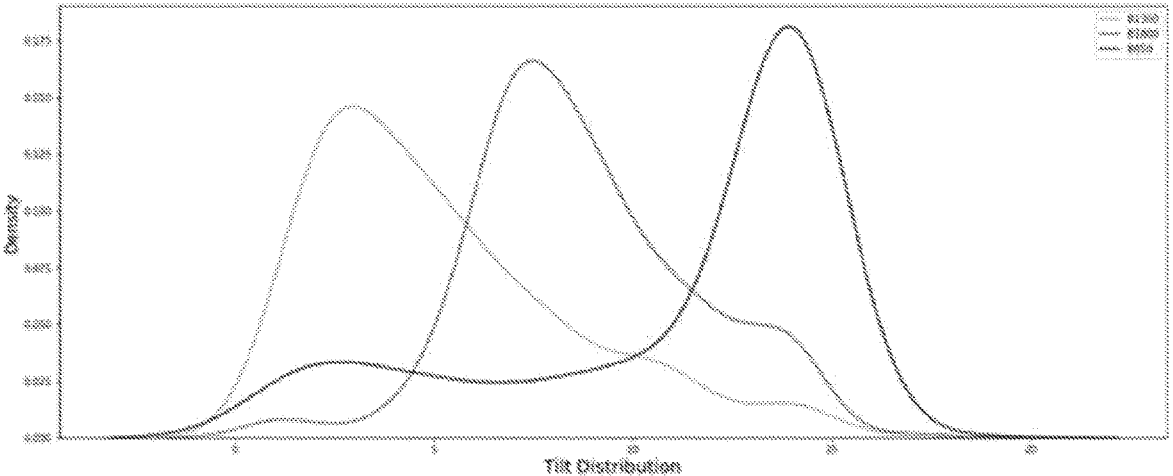
FIG. 5C illustrates a graphical representation of electronic tilt distribution of the telecommunication towers, in accordance with an embodiment of the present disclosure.

FIG. 5C illustrates a graphical representation of electronic tilt distribution of the telecommunication towers, in accordance with an embodiment of the present disclosure.

In the graph, the x-axis may include tilt distribution, and the y-axis may include density.

Figure 5D:
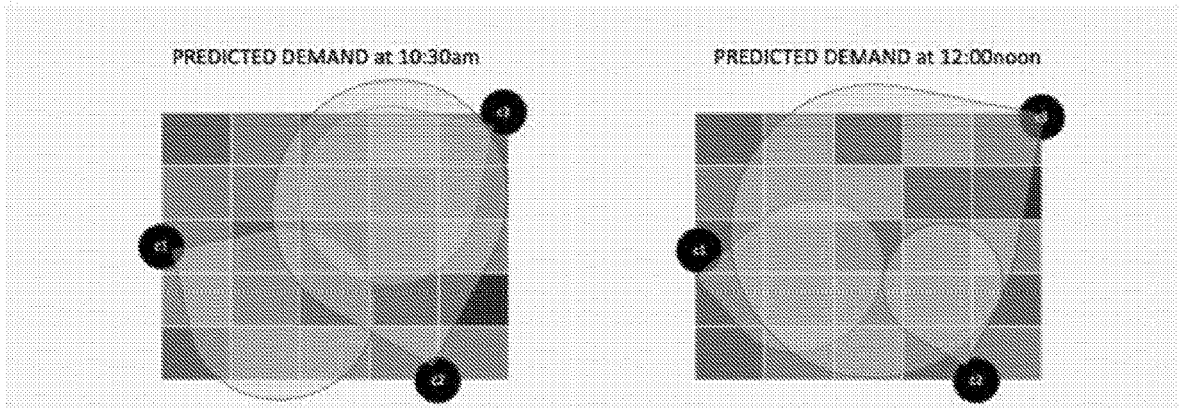
FIG. 5D illustrates a graphical representation of joint supply demand optimization in the network for different timings in a day, in accordance with an embodiment of the present disclosure.

FIG. 5D illustrates a graphical representation of joint supply demand optimization in the network for different timings in a day, in accordance with an embodiment of the present disclosure.

The left graphical representation depicts predicted demand at 10:30 AM and the right graphical representation depicts predicted demand at 12:00 PM. The graphical representation depicts that multiple grids (in each time window), multiple cells (not optimize a cell independent of others), multiple objectives (quality, coverage, utilization, and interference) may be jointly optimized.

Figure 6A:
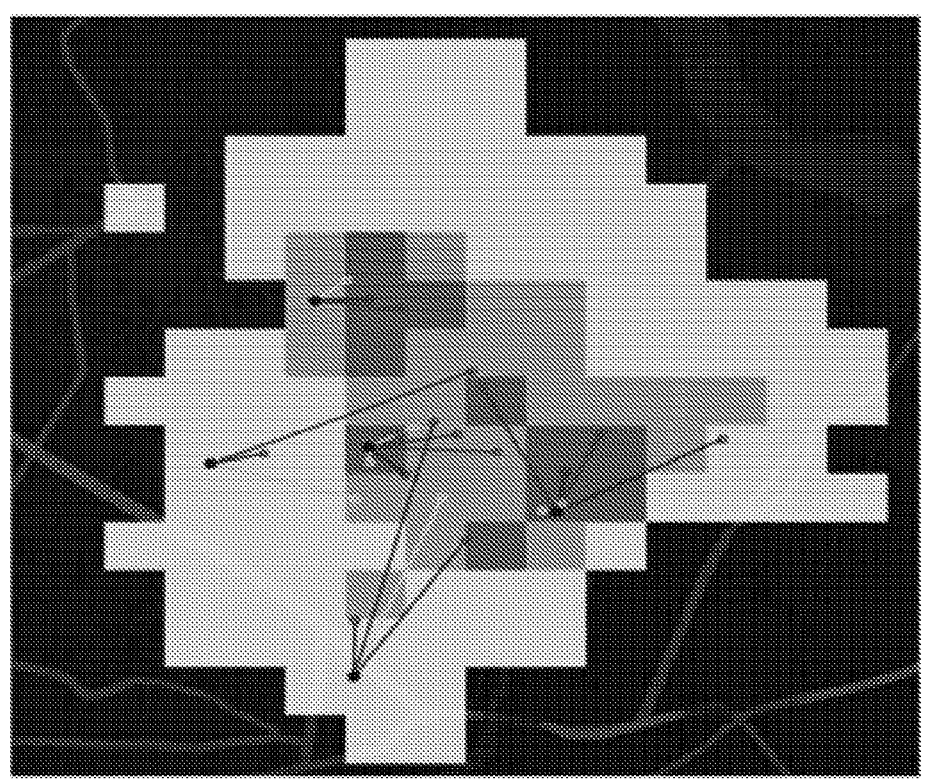
FIG. 6A illustrates an exemplary schematic-representations of spatial visualization and optimization of the telecommunication towers, in accordance with an embodiment of the present disclosure.
Figure 6B:
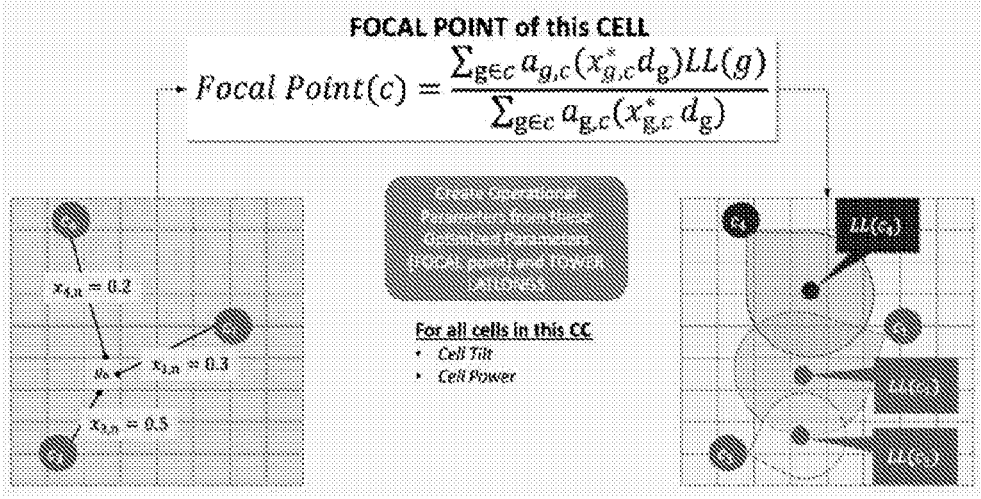
FIG. 6B illustrates an exemplary schematic representations of focal point calculation, in accordance with an embodiment of the present disclosure.
Figure 6C:
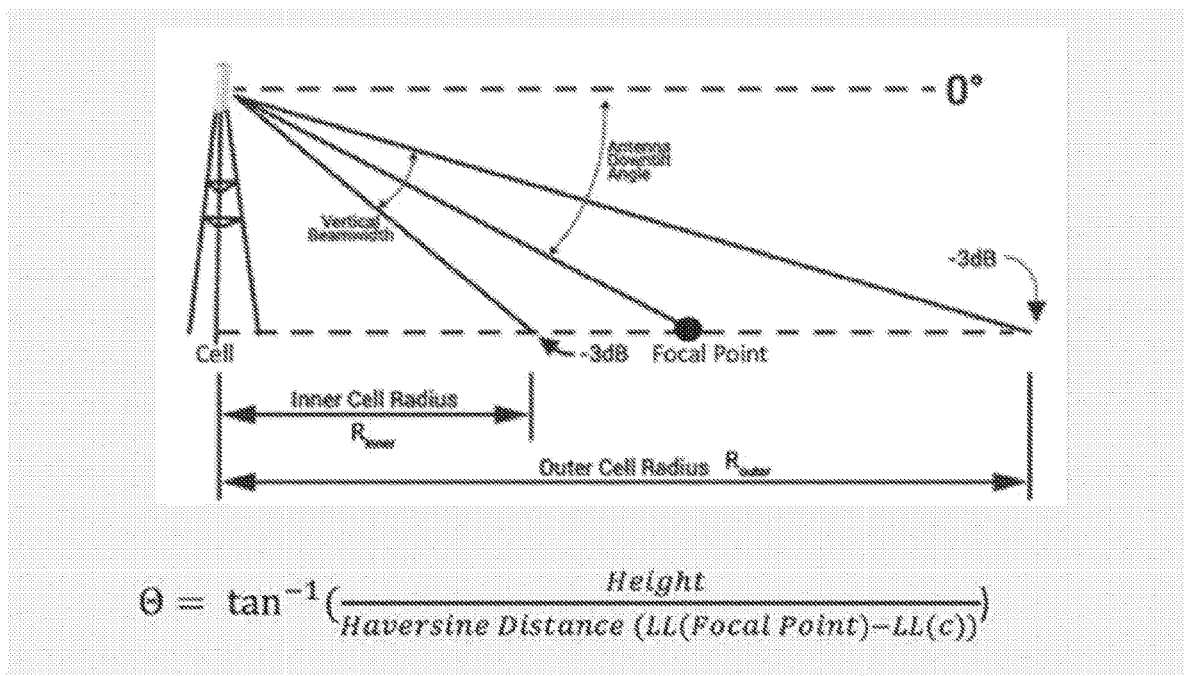
FIG. 6C illustrates an exemplary schematic representations of electronic tilt estimation calculation, in accordance with an embodiment of the present disclosure.

FIG. 6A illustrates and exemplary schematic representations of spatial visualization and optimization of the telecommunication towers, in accordance with an embodiment of the present disclosure.

Figure 7:
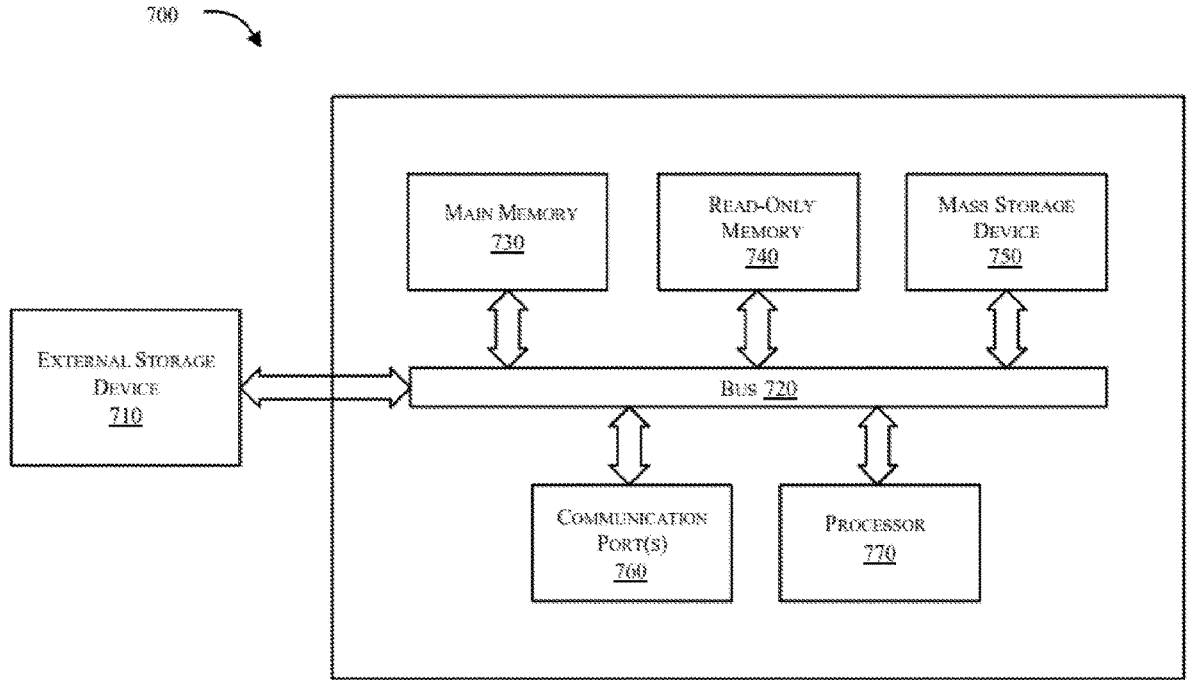
FIG. 7 illustrates an exemplary computer system in which or with which embodiments of the present invention can be utilized, in accordance with embodiments of the present disclosure.

FIG. 7 illustrates an exemplary computer system in which or with which embodiments of the present invention can be utilized in accordance with embodiments of the present disclosure. As shown in FIG. 7, computer system (700) can include an external storage device (710), a bus (720), a main memory (730), a read only memory 740, a mass storage device (750), communication port (760), and a processor (770). A person skilled in the art will appreciate that the computer system may include more than one processor and communication ports. Examples of processor (770) include, but are not limited to, an Intel® Itanium® or Itanium 2 processor(s), or AMD® Opteron® or Athlon MP® processor(s), Motorola® lines of processors, FortiSOC™ system on chip processors or other future processors. Processor (770) may include various modules associated with embodiments of the present invention. Communication port (760) can be any of an RS-232 port for use with a modem-based dialup connection, a 10/100 Ethernet port, a Gigabit or 10 Gigabit port using copper or fiber, a serial port, a parallel port, or other existing or future ports. Communication port (760) may be chosen depending on a network, such a Local Area Network (LAN), Wide Area Network (WAN), or any network to which computer system connects. Memory (730) can be Random Access Memory (RAM), or any other dynamic storage device commonly known in the art. Read-only memory (740) can be any static storage device(s) e.g., but not limited to, a Programmable Read Only Memory (PROM) chips for storing static information e.g., start-up or BIOS instructions for processor 770. Mass storage (750) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 13K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus (720) communicatively coupled processor(s) (770) with the other memory, storage, and communication blocks. Bus (720) can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor (770) to software system.

Optionally, operator and administrative interfaces, e.g., a display, keyboard, and a cursor control device, may also be coupled to bus (720) to support direct operator interaction with a computer system. Other operator and administrative interfaces can be provided through network connections connected through communication port (760). The external storage device (710) can be any kind of external hard-drives, floppy drives, IOMEGA® Zip Drives, Compact Disc—Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present invention provides a robust, efficient, and effective systems and methods for optimizing supply demand in a telecommunication network.

The present disclosure provides systems and methods for determining the optimal configuration (electronic tilt) of a cell using the data and Artificial Intelligence (AI) techniques, without manual effort to optimize the network.

The present disclosure provides systems and methods for optimal user experience with the existing network infrastructure.

The present disclosure provides systems and methods for use raw telecom data to prepare the data for optimization and estimate electronic tilt values ensuring the pre-defined guidelines The present disclosure provides systems and methods for improving quality, coverage, cell utilization and reducing interference on the telecommunication network.

The present disclosure provides systems and methods for improving network throughput and reduced number of dropped and mute calls.

The present disclosure provides systems and methods for predicting hourly user demand with great precision to allocate a group of telecommunication cellular towers based on the capacity and quality of the telecommunication cellular towers.

We claim:

1. A system for optimizing supply demand in a network, said system comprising:

supply demand optimizing (SDO) device operatively coupled to one or more first computing devices and a second computing device, wherein the one or more first computing devices are associated with a plurality of cells, wherein each cell further having a telecommunication tower, and wherein, said SDO device further comprises a processor that executes a set of executable instructions that are stored in a memory upon execution of which, the processor causes the SDO device to:

receive, a set of data packets from the one or more first computing devices, said set of data packets pertaining to a set of telecom parameters associated with a plurality of cells;

extract, a first set of attributes from the received set of data packets, the first set of attributes pertaining to a demand, signal quality, longitude, latitude and allocability at a predefined grid associated with the plurality of cells;

determine, based on the first set of attributes and on execution of a first set of instructions, an optimal cell harmonization index, wherein the processor causes the execution of the first set of instructions to refine the optimal cell harmonization index by:

obtaining the optimal cell harmonization index:

preparing, for each cell of the plurality of cells, a first number of edges corresponding to a predefined quality value of the cell based on grid demand, signal quality, allocability:

preparing, for each cell, a second number of edges corresponding to a predefined interference value based on grid demand, cell frequency band, signal quality, allocability, scaling factor;

preparing, for each cell, a third number of edges corresponding to a predefined overlap value of the cell based on grid demand, cell frequency band, signal quality, allocability;

preparing, for each cell, a fourth number of edges corresponding to the obtained optimal cell harmonization index based on grid demand, band-weight, allocability; and based on the first, second, third, and fourth number of edges, determining the refined optimal cell harmonization index;

compute, based on the refined optimal cell harmonization index and on execution of a second set of instructions, one or more inequality constraints associated with the plurality of cells;

optimize, by an optimizer module, the set of data packets to enable a hyper parameter tuning of the set of telecom parameters and based on the one or more inequality constraints the cell harmonization index;

and based on the hyper parameter tuning obtained and the extracted first set of attributes, determine a focal point of each cell.

2. The system as claimed in claim 1, wherein the processor further configures the SDO to:

extract an inclination value of each said cell based on the focal point of each said cell;

extract a height of a telecommunication tower associated with the cell; and based on the extracted inclination value, the focal and height of the telecommunication tower, determine an optimal electronic tilt value of each said cell.

3. The system as claimed in claim 2, wherein the processor further configures the SD to:

determine a cell utilization based on a minimum and maximum limit set on the telecommunication towers, wherein the minimum and maximum limit is based on a frequency spectrum of each cell associated with the telecommunication towers; and set the optimal electronic tilt value equal to an actual tilt value if the cell utilization is below a predefined threshold associated with the minimum or the maximum limit of the cell.

4. The system as claimed in claim 1, wherein the set of telecom parameters comprises a geohash, one or more predefined Radio Resource Control (RRC) sessions, one or more edge properties, and a demand forecast at a predefined time interval associated with the plurality of cells.

5. The system as claimed in claim 4, wherein the processor obtains the set of telecom parameters by configuring the SDO to:

extract a user-cell session log from a local service request (LSR) for the plurality of cells and one or more grids associated with the plurality of cells;

aggregate, based on the user-cell session log, a user level data raw location data such as latitude and longitude into the geohash;

aggregate one or more Radio Resource Control (RRC) sessions at a predefined time interval and compute quality, interference and demand for the generated geohash;

compare the one or more RRC sessions with a predefined quality and demand;

remove one or more RRC sessions below a pre-determined threshold data-volume and Quality based on the comparison of the one or more RRC sessions with the predefined quality and demand;

calculate one or more edge properties of the plurality of cells; and predict a demand forecast at a predefined time interval based on the calculated one or more edge properties.

6. The system as claimed in claim 1, wherein the processor causes the execution of the second set of instructions associated with the one or more inequality constraints to:

build a first number of cells for cell maximum utilization constraint for each cell;

build a second number of cells for cell minimum utilization constraint for each cell;

based on the first and second number of cells, determine a cell utilization constraints for each cell;

build a third number of cells for grid minimum coverage constraint for each grid;

build a fourth number of cells for grid maximum coverage constraint for each grid;

based on the third and fourth number of cells, determine a grid utilization constraints for each cell;

build a set of edges for each grid demand fulfilled by each said cell;

based on the built first, second, third and fourth number of cells, build a cell-harmonization constraint based on frequency band of the cell; and based on the determined cell utilization constraints, grid utilization, cell harmonization constraints, determine the one or more inequality constraints of the cell.

7. The system as claimed in claim 1, wherein the processor causes the optimizer module to:

combine a quality and a cell harmonization, an Interference, an Overlap of each said cell, and one or more inequality constraints in a weighted manner to obtain an optimized electronic tilt value for each cell;

aggregate the quality, the cell harmonization, the interference, the overlap, the one or more inequalities, to obtain an optimal demand fraction between each cell and grid.

8. The system as claimed in claim 1, wherein a centralized server is operatively coupled to the SDO device, wherein the processor causes the SDO device to send an optimal electronic value of the plurality of cells serving the predefined grid through a network, wherein the centralized server further stores grid details, the set of telecom parameters.

9. The system as claimed in claim 1, wherein the SDO device is remotely monitored and the data, application and physical security is fully ensured.

10. A method for optimizing supply demand in a network, said method comprising:

receiving, by a supply demand optimizing SDO device, a set of data packets from the one or more first computing devices, said set of data packets pertaining to a set of telecom parameters associated with a plurality of cells, wherein the SDO device operatively coupled to one or more first computing devices and a second computing device, wherein the one or more first computing devices are associated with a plurality of cells, wherein each cell further having a telecommunication tower, and wherein, said SDO device further comprises a processor—that executes a set of executable instructions that are stored in a memory;

extracting, by the SDO device, a first set of attributes from the received set of data packets, the first set of attributes pertaining to a demand, signal quality, longitude, latitude and allocability at a predefined grid associated with the plurality of cells;

determining, by the SDO device, based on the first set of attributes and on execution of a first set of instructions, an optimal cell harmonization index, wherein on execution of the first set of instructions to refine the optimal cell harmonization index, the method comprises the steps of:

obtaining, by the SDO device, the optimal cell harmonization index;

preparing, by the SDO device, for each cell of the plurality of cells, a first number of edges corresponding to a predefined quality value of the cell based on grid demand, signal quality, allocability;

preparing, by the SDO device, for each cell a second number of edges corresponding to a predefined interference value of the cell based on grid demand, cell frequency band, signal quality, allocability, scaling factor;

preparing, by the SDO device, for each cell a third number of edges corresponding to a predefined overlap value of the cell based on grid demand, cell frequency band, signal quality, allocability;

preparing, by the SDO device, for each cell a fourth number of edges corresponding to the obtained cell harmonization index of the cell based on grid demand, band-weight, allocability; and based on the first, second, third, and fourth number of edges, determining, by the SDO device, the refined optimal cell harmonization index;

computing, by the SDO device, based on the refined optimal cell harmonization index and on execution of a second set of instructions, one or more inequality constraints associated with the plurality of cells;

optimizing, by the SDO device, by an optimizer module, the set of data packets to enable a hyper parameter tuning of the set of telecom parameters and based on the one or more inequality constraints the cell harmonization index;

and based on the hyper parameter tuning obtained and the extracted first set of attributes, determining, by the SDO device, a focal point of each cell.

11. The method as claimed in claim 10, wherein the method further comprises the steps of:

extracting, by the SDO device, an inclination value of each said cell based on the focal point of each said cell;

extracting, by the SDO device, a height of a telecommunication tower associated with the cell; and based on the extracted inclination value, the focal and height of the telecommunication tower, determining, by the SDO device, an optimal electronic tilt value of each said cell.

12. The method as claimed in claim 11, wherein the method further comprises the steps of:

determining, by the SDO device, a cell utilization based on a minimum and maximum limit set on the telecommunication towers, wherein the minimum and maximum limit is based on a frequency spectrum of each cell associated with the telecommunication towers; and setting, by the SDO device, the optimal electronic tilt value equal to an actual tilt value if the cell utilization is below a predefined threshold associated with the minimum or the maximum limit of the cell.

13. The method as claimed in claim 10, wherein the set of telecom parameters comprises a geohash, one or more predefined Radio Resource Control (RRC) sessions, one or more edge properties, and a demand forecast at a predefined time interval associated with the plurality of cells.

14. The method as claimed in claim 10, wherein to obtain the set of telecom parameters the method comprises the steps of:

extracting, by the SDO device, a user-cell session log from a local service request (LSR) for the plurality of cells and one or more grids associated with the plurality of cells;

aggregating, by the SDO device, based on the user-cell session log, a user level data raw location data such as latitude and longitude into the geohash;

aggregating, by the SDO device, one or more Radio Resource Control (RRC) sessions at a predefined time interval and compute quality, interference and demand for the generated geohash;

comparing, by the SDO device, the one or more RRC sessions with a predefined quality and demand;

removing, by the SDO device, one or more RRC sessions below a predetermined threshold data-volume and Quality based on the comparison of the one or more RRC sessions with the predefined quality and demand;

calculating, by the SDO device, one or more edge properties of the plurality of cells; and predicting, by the SDO device, a demand forecast at a predefined time interval based on the calculated one or more edge properties.

15. The method as claimed in claim 10, wherein on execution of the second set of instructions associated with the one or more inequality constraints, the method comprising the steps of:

building, by the SDO device, a first number of cells for cell maximum utilization constraint for each cell;

building, by the SDO device, a second number of cells for cell minimum utilization constraint for each cell;

based on the first and second number of cells, determining, by the SDO device, a cell-utilization constraints for each cell;

building, by the SDO device, a third number of cells for grid minimum coverage constraint for each grid;

building, by the SDO device, a fourth number of cells for grid maximum coverage constraint for each grid;

based on the third and fourth number of cells, determining, by the SDO device, a grid utilization constraints for each cell;

building, by the SDO device, a set of edges for each grid demand fulfilled by each said cell;

based on the built first, second, third and fourth number of cells, building, by the SDO device, a cell-harmonization constraint based on frequency band of the cell; and based on the determined cell utilization constraints, grid utilization, cell harmonization constraints, determining, by the SDO device, the one or more inequality constraints of the cell.

16. The method as claimed in claim 10, wherein the method comprises the steps of:

combining, by an optimizer module associated with the SDO device, a quality and a cell harmonization, an Interference, and an Overlap of each cell, and one or more inequality constraints in a weighted manner to obtain an optimized electronic tilt value for each cell;

aggregating, by the optimizer module, the quality, the cell harmonization, the interference, the overlap, the one or more inequalities, to obtain an optimal demand fraction between each cell and grid.

17. The method as claimed in claim 10, wherein a centralized server is operatively coupled to the SDO device, wherein the processor causes the SDO device to send-an optimal electronic value of the plurality of cells serving the predefined grid through a network, wherein the centralized server further stores grid details, the set of telecom parameters.

18. The method as claimed in claim 10, wherein the SDO device is remotely monitored and the data, application and physical security is fully ensured.

* * * * *